(12) United States Patent
Demsey et al.

(10) Patent No.: US 7,281,248 B2
(45) Date of Patent: Oct. 9, 2007

(54) VIRTUALIZED AND REALIZED USER INTERFACE CONTROLS

(75) Inventors: Seth M. Demsey, Kirkland, WA (US); Tuan Huynh, Seattle, WA (US); Christopher W. Lorton, Bothell, WA (US); Ramasamy Krishnaswamy, Redmond, WA (US); Bruce E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/299,460

(22) Filed: Nov. 19, 2002

(65) Prior Publication Data

US 2004/0095387 A1     May 20, 2004

(51) Int. Cl.
*G06F 9/455* (2006.01)
*G06F 9/44* (2006.01)

(52) U.S. Cl. .......................................... 718/1; 717/108
(58) Field of Classification Search .................... 718/1; 717/108
See application file for complete search history.

(56) References Cited

U.S. PATENT DOCUMENTS

| 5,920,873 | A | 7/1999 | Van Huben et al. |
| 5,974,424 | A | 10/1999 | Schmuck et al. |
| 6,110,228 | A | 8/2000 | Albright et al. |
| 6,324,686 | B1 | 11/2001 | Komatsu et al. |
| 6,385,636 | B1 | 5/2002 | Suzuki |
| 6,957,439 | B1 * | 10/2005 | Lewallen ..................... 719/328 |
| 2002/0065879 | A1 * | 5/2002 | Ambrose et al. ........... 709/203 |
| 2003/0080990 | A1 * | 5/2003 | Lyness ....................... 345/713 |
| 2004/0083467 | A1 * | 4/2004 | Hanley et al. .............. 717/148 |

* cited by examiner

*Primary Examiner*—Lewis A. Bullock, Jr.
*Assistant Examiner*—Kenneth Tang
(74) *Attorney, Agent, or Firm*—Lee & Hayes, PLLC

(57) ABSTRACT

One aspect relates to a process and associated apparatus that implements a user interface (UI) control within a computer environment. The computer environment includes a managed code portion and a native code portion. The implementing the UI control includes creating a plurality of control node data structures within the managed code portion. A managed UI control is virtualized within the managed code portion by associating and/or batching at least two of the control node data structures. The UI control is realized in the native code portion by migrating the managed UI control into the native code portion. In certain aspects, the UI control is populated and parented prior to the realizing.

42 Claims, 18 Drawing Sheets

Managed Code Portion 106

User Interface (UI) Control Object
650

Native Code Portion 108

*Fig. 5a*

VIRTUALIZED AND REALIZED USER INTERFACE CONTROLS

TECHNICAL FIELD

This invention relates to user interface (UI) controls, and more particularly to UI controls that are formed within a virtual machine (VM).

BACKGROUND

Many computers that utilize a virtual machine (VM) include a managed code portion and a native code portion. The VM allows a user application to run on different platforms (i.e., interface with multiple operating systems). In computer systems that run a VM, native resources are allocated as an effect of a user interface (UI) library code.

UI controls are displayed on a computer display such as a monitor or a flat panel display, and allow a user to interface with the computers. Examples of the UI controls are menus, commands, lists, trees, control tables, etc. It is common for code developers (and therefore users) to neglect the considerable number of signal commands normally associated with managing UI controls in view of the processor and memory capabilities of many current computers.

UI controls typically include multiple control nodes or control items that may be associated with each other either in hierarchical form (where one control is the parent of another control), in tabular form (where multiple controls are associated in a table format), in list form, or in some other associated form. Examples of UI controls that can be hierarchically associated include trees, commands, and menus. In current VM systems, native resources can be allocated in both native code portions and managed code portions to realize these UI controls. Present UI controls can produce, realize, and save multiple concurrently-saved copies. For example, as the UI control is transferred among the managed code portion, the native code portion, and the OS itself, a copy of each UI control is often stored in memory locations of each respective memory portion. These native code resources must synchronize with their managed code counterpart in the managed code portion or else inconsistencies can exist between the different copies of the UI control. Executing code in managed code necessitates that the UI controls in the native code are synchronized with their counterparts in the managed code. Synchronization between the managed code and the native code has to be frequently performed to decrease any difference between the code describing the UI controls.

The code transitions typically necessary for system calls between the native code portion and the managed code portion of VMs, however, become strained in resource constrained devices. This strain exists especially for resource-demanding tasks, such as UI control realization. Examples of resource constrained devices are PDAs, cell phones, embedded devices, etc. that rely on more limited software and operating systems than those applied to full size computers that allow the resource constrained devices to operate quickly and accurately. It would thus be beneficial to provide a way to decrease the number of system calls between the native code portion and the managed code portion.

SUMMARY

One aspect of this disclosure relates to a method and associated apparatus for implementing and managing a user interface (UI) control within a computer environment. The computer environment includes a managed code portion and a native code portion. Implementing the UI control includes creating a plurality of control node data structures within the managed code portion. A managed UI control is virtualized within the managed code portion by associating at least two of the control node data structures. The UI control is realized in the native code portion by migrating the managed UI control into the native code portion. In certain aspects, the UI control is populated and parented prior to the realizing.

BRIEF DESCRIPTION OF THE DRAWINGS

The same numbers are used throughout the drawings to reference like features and components.

FIGS. 5a, 5b, 5c, and 5d illustrate a block diagram of one embodiment of a process for virtualizing and realizing the UI control to be performed in the computer environment illustrated in FIG. 1;

DETAILED DESCRIPTION

This disclosure relates to a process, and associated system, that can virtualize and realize user interface (UI) controls from control node data structures, or nodes. The control objects (as typically contained in software libraries) and control node data structures provide a software representation of UI controls that following realization, can be displayed on computer displays. The term virtualize as used in this disclosure applies not only to the original control node data structures, but also control node data structures that were applied to previously realized UI controls.

Figure 1:
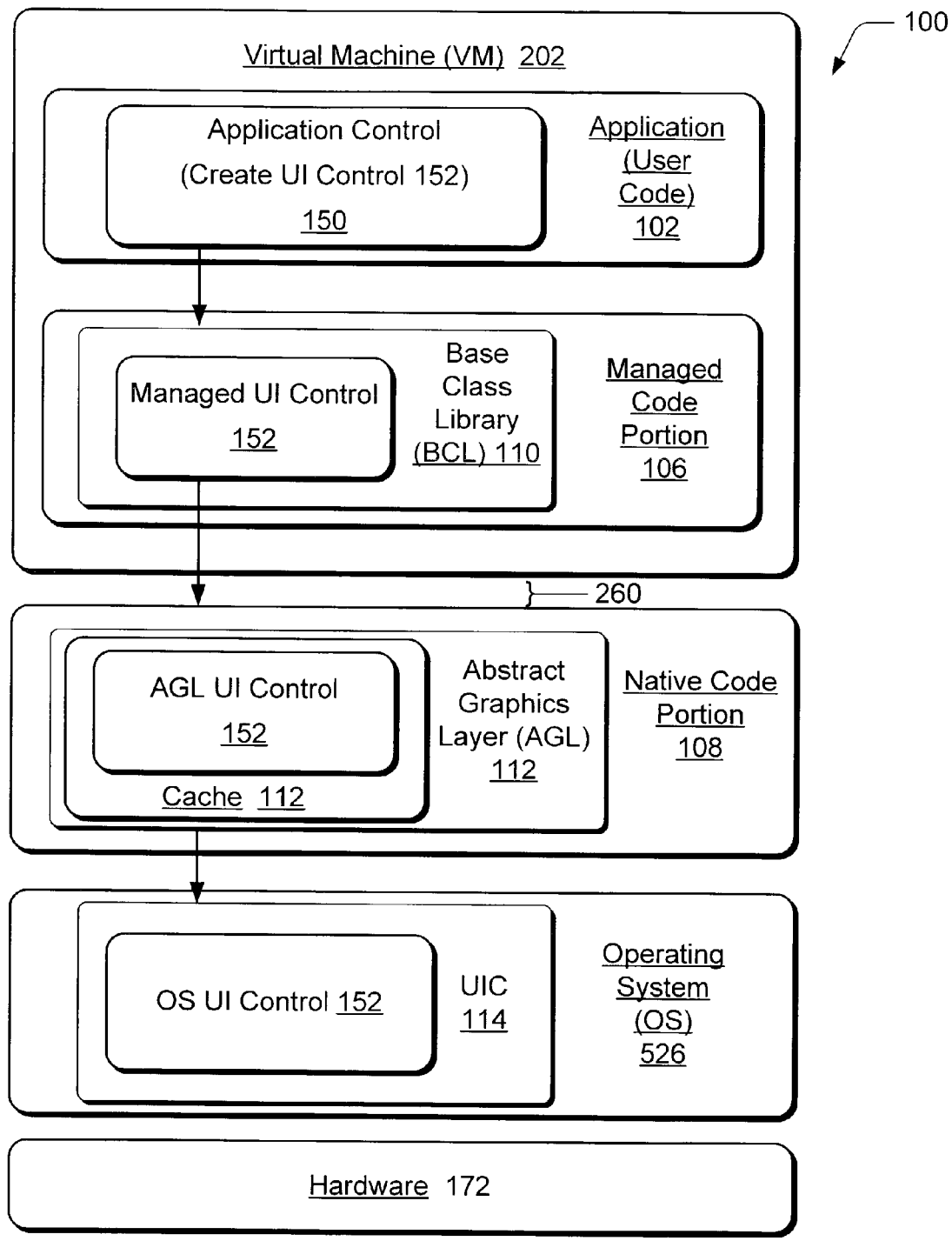
FIG. 1 illustrates a block diagram of one embodiment of a computer environment such as can virtualize and realize a user interface (UI) control.
Figure 9:
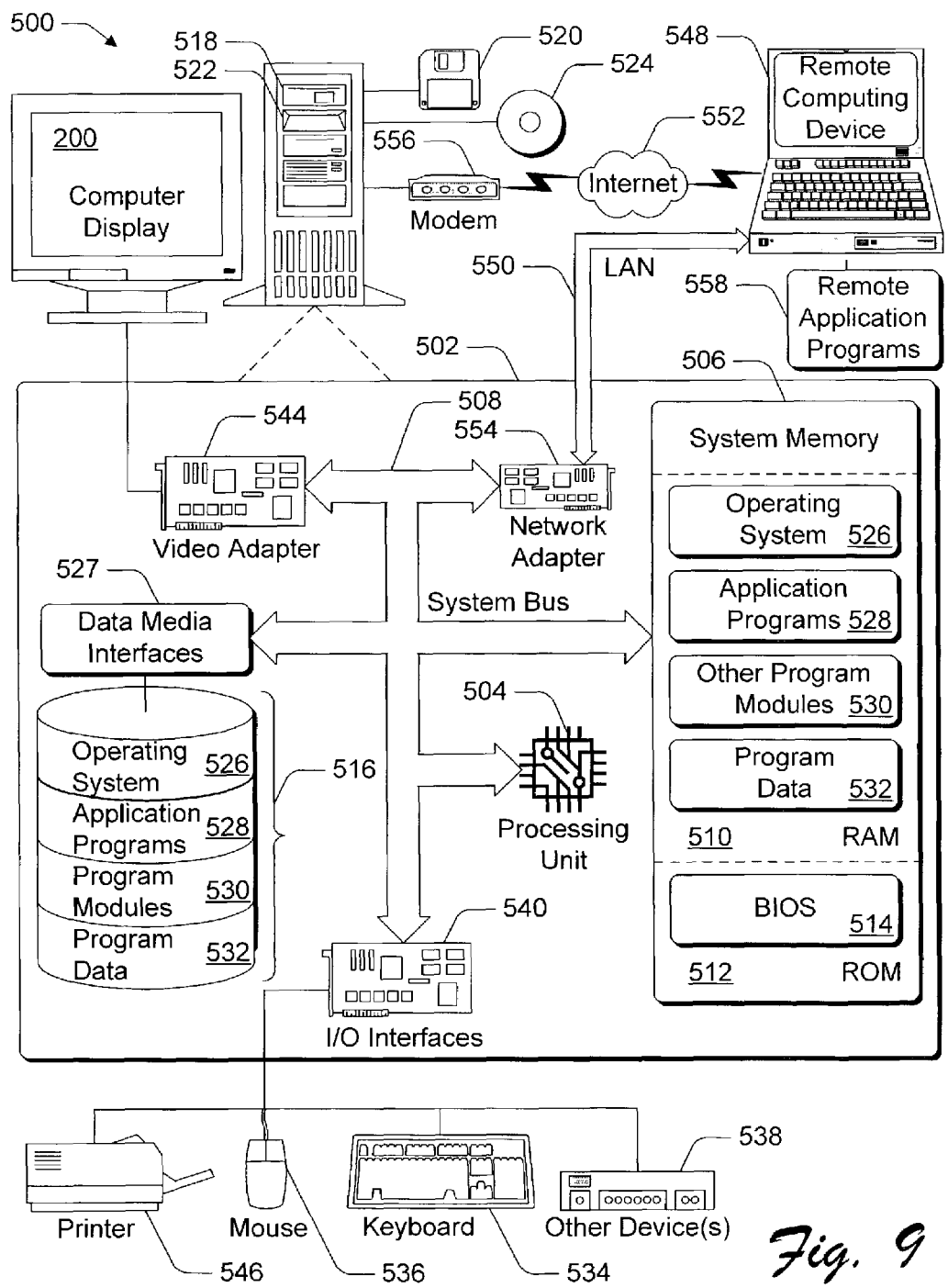
FIG. 9 illustrates a detailed block diagram of a more detailed embodiment of the computer environment as shown in FIG. 1 such as is used to virtualize and realize the UI control.

FIG. 1 illustrates one embodiment of computer environment 100 running a virtual machine (VM) 202 that can virtualize and realize the UI control 152. The VM 202 embodiments limit common problems with prior art systems, including memory management and reducing memory leaks. FIG. 9, as described subsequently, illustrates one detailed embodiment of the structural components associated with the computer environment 100. The VM 202 allows similar software to be run on dissimilar platforms and operating systems. .NET (produced and distributed by Microsoft® Corporation) and Java are two available software programs whose architecture is based on the architecture of the VM.

The VM 202 architecture can run different application programs on different platforms (i.e., interface with multiple operating systems). The VM 202 architecture includes a managed code portion 106 (which runs a managed code). The computer environment 100 further includes a native code portion 108 (that runs a native code), an operating system (OS) 526, and a hardware portion 172. The managed code portion 106 and the native code portion 108 combine to execute a managed execution process. In one embodiment, part of the VM 202 stores the system calls associated with one or more varied UI controls 152. Certain embodiments of the VM 202 are intended to be small and performance directed as to user input and how information is displayed on the screen.

The goals of the VM 202 include enhancing size, performance, and flexibility characteristics of the UI within the computer environment 100. The VM 202 has a base code library 110 (referred to in Java as an intermediate language). The intermediate language is executed by the VM 202, and provides some degree of ease of programming, security, memory management, etc. which provides a more stable experience for the user.

While FIG. 1 discloses one embodiment of VM 202, it is to be understood that a large variety of VMs exist in the computer networking technologies. Different embodiments of VMs may include components with different functions, or similarly functioning components may be provided with different names (e.g., those VMs that are produced by different software producers). In certain embodiments of VM, the managed code portion 106 includes the application program 102 while in others the managed code portion does not. In certain embodiments of VM, the native code portion 108 includes the operating system 526 while in other embodiments it does not. The present invention is directed to all embodiments of VM 202, regardless of the particular configuration.

Each UI control 152 is made from a plurality of control node data structures 654. Different ones of the control node data structures are associated with each other and with the control object 650 as described subsequently. Control node data structures 654 as used within this disclosure can be hierarchically associated using, e.g., menus, trees, and commands. Control node data structures 654 can be linearly arranged using, e.g., tables and lists. Control objects can also include control node data structures 654 that are arranged with different types of hierarchical and/or linear arrangements. It is also possible to utilize other control objects 650 and control node data structures 654 to form UI controls 152.

Techniques are described herein to virtualize, populate, parent, and realize the UI controls 152 which can operate using fewer system calls across a VM/native boundary 260 between the managed code portion 106 and the native code portion 108 than traditional systems that require one system call traverse the VM/native boundary 260 for each control node data structure 654 included in the UI control 152. By comparison, in this disclosure, the entire UI control 152, regardless of the number of control node data structures 654 contained therein, can be realized and virtualized using a single system call (or anyway a lesser number of signal calls than the number of control node data structures in the UI control 152). In another embodiment, there may also be a plurality of system calls provided between the managed code portion 106 and the native code portion 108 in which each system call transfers a plurality of, or a single, control node data structure. For example, rather than waiting for an entire tree to be built, the control 11 nodes can be migrated to native code after a prescribed number (e.g., 10, 15, 50, or whatever) of control node data structures have been created in managed code.

In this disclosure, the term "UI control" with the reference numeral 152 is applied to those computer software components that are located anywhere in the computer environment 100. The UI control 152 may be temporarily located in the managed code portion 106, the native code portion 108 the operating system 526, some other location, or a combination of these locations. The UI control 152 may have different characteristics and represent different data types depending on where the UI control is located within the computer environment. For example, during virtualization in the managed code portion 106, the UI control 152 cannot be displayed on the computer display 200 in the computer environment 100. By comparison, when the UI control 152 is in the OS 526, the UI control can be displayed on the computer display 200. Certain location or descriptive terms may be appended to the term "UI control" to describe the location within the computer environment 100. For example, if the UI control is located in the managed code portion 106, the UI control may be referenced as a managed UI control.

Multiple control node data structures 654 are associated in different associations to form different UI control 152 configurations. The different control node data structure associations can be at least partially classified as hierarchical models or linear models. In the hierarchical model, there is at least one parent node and at least one depending child node. With list UI controls 152, the control node data structures 654 are arranged in a list format. With tabular UI controls 152, the control node data structures 654 are associated in table format. Such associations occur within the architecture of the VM 202. These different models/configurations of UI controls 152 are described subsequently relative to FIGS. 2 to 4.

The concepts described herein allow developers to leverage the VM (e.g., the NET development tool) into different sizes and types of computer environments 100 without extensive modifications, reprogramming, or recoding. As such, the users can be protected from having to deal with a considerable amount of the complexity associated with the computer environment. A tool and developer suite optionally associated with the VM allows users to code/debug, etc. Though the concepts described here are applicable to all computer environments 100, in general they are especially beneficial to such resource constrained devices as PDA's, cellular telephones, computer devices, embedded devices smart phones, video camera, digital cameras, microprocessor devices, and microcomputer devices. To provide some concept of scale, many resource constrained devices are typically less than $\frac{1}{20}^{th}$ of the size (and often less than $\frac{1}{60}^{th}$ the size) of many desktop or laptop computers. Traditionally, the VM 202 has been applied to larger computer systems, but not resource constrained devices. Traditionally, resource constrained devices have little or no documentation, no shell, and thus it is difficult for developers to program to perform tasks on resource constrained devices. The relatively small size, and somewhat simplified operation, of the resource constrained devices require that the designers program their application programs effectively and in a manner that complies with platform guidelines.

One embodiment of the VM 202 is the re-architected Compact Network Framework® (produced and distributed by Microsoft® Corporation) that can run on resource constrained devices using an intermediate level code. The Compact Network Framework (unlike other embodiments of the VM 202) can run on any processor or with any operating system.

As shown in FIG. 1, the native code portion 108 sits directly on the operating system (OS) 526, and communicates using the native code language of the OS. Therefore, the native code portion 108 has to compile directly to the OS 526. The native code portion 108 codes in, and compiles in, such native computer languages as C, C++, Basic, etc. which the OS can handle. Such object oriented computer languages as C++ are most applicable if building large customizable applications, but are not well suited for resource-constrained devices. The native code portion 108 contains such features as a just in time (JIT) compiler, a class loader, a garbage collector, an execution environment, and/or an interpreter. The garbage collector acts only on managed objects. In one embodiment, all the cleanup of the objects is performed in the native code portion and the operating system. In order for the associations to be maintained in the managed code portion, the garbage collector must not destroy the objects and/or the associations (links) in the managed mode portion. As such, the associations and objects associated with the controls are maintained in the managed code portion, and can be quickly accessed by the native code portion and/or the operating system using the just in time compiler. The amount of data stored in the native code portion and the operating system is thereby reduced compared to if the data is maintained in the operating system. While a developer may provide only one way to perform a function for a particular application program in a resource constrained device, he may provide different techniques (including shortcuts) to perform the same function in a similar application program for a laptop or desktop computer.

The managed code portion 106 sits on top of the native code portion 108. Therefore, the native code portion 108 compiles for the OS directly. The managed code portion contains a variety of class libraries that are utilized by the application program. One example of a class library that is included in the managed code portion 106 is a base class library (BCL) 110 which is coded in byte code language. The byte code language is an intermediate language between the language of the applications program 102 and that of the native code portion 108. The BCL 110 largely characterizes the interaction of the user of the computer environment 100, and also determines the types of user experience when using any particular application program. The BCL commonly calls code from the managed code portion through to the native code portion, such as a native operating system, to perform such low level functionality as management of UI controls and UI windows. The managed code portion is in the language of the user application program 102 and the intermediate language.

A VM/native boundary 260 is located between the native code portion 108 and the managed code portion 106, which represents a processor expensive transition for signals calls to transition due largely to the difference in languages between the codes portions 106 and 108. To increase performance, the amount of data (which corresponds to the number of signal calls) traversing the VM/native boundary 260 should be decreased especially on resource constrained devices. When the UI control 152 is initiated, the effective communication of data contained in that UI control 152 can be important. If the data is not transferred quickly, considerable time may be required to produce the UI control 152. Users of slow and/or unresponsive devices generally do not have a good user experience, and do not gain confidence in the computer software or the associated computer environment. Limiting the number of system calls across the VM/native boundary 260 can improve the responsiveness and quality of the service experienced by the user.

The identity of many prior art VMs 202 can be traced from the displayed output. For example, when a Java applet runs, a skilled user or developer can positively identify it as a Java applet. Many present embodiments of VM 202 permit application programs to seamlessly fit into the native device application, regardless of the identity of the native device. The VM 202 defines the user interactivity, not the look and feel of the application program. As such, the appearance and characteristics of each application is primarily determined by the developer of each particular application program, and not the characteristics of the particular VM 202. Each application program running on the VM "looks and feels" like the application program as designed by the developer. For example, a Pocket PC application running on the VM 202 looks and feels to the user different from a cellular phone application and/or an embedded controller application, as determined by the developer of the particular application program. Source code, or alternatively XML or some other computer language, could be used by the VM.

Memory management in traditional computer programming languages (Eiffel, C, C++, Pascal, Fortran, Cobol, etc.) has to allocate memory, and then free it when done. If the allocated memory is not freed, the memory can no longer be reclaimed. By comparison, the computer environment running a VM 202 such as .NET or Java does the memory management.

The application or application program 102 is typically programmed by a code developer to provide the functionality within the computer environment 100. The developer typically programs the code for the application program, and has the program compiled, loaded, and linked to create the executable file (.exe) for the application program. The .exe file is executed by the user to run the application program, which therefore causes the application program to perform as desired by the user.

As illustrated in FIG. 1, the computer environment 100 further includes the base class library (BCL) 110, an abstract graphics layer (AGL) 112, and a user interface code layer (UIC) 114 that are respectively associated with the managed code portion 106, the native code portion 108, and the OS 526. As such, signal calls which are generated by the application program (e.g. by user input or program libraries) that contain the UI control 152 are transmitted through the BCL library 110 of the managed code portion 106, to the AGL 112 of the native code portion 108, and to the UIC layer 114 of the OS 526. Similarly, certain signal calls that contain the UI control 152, are generated by the OS 526 and are transmitted through the UIC layer 114, to the AGL 112 in the native code portion 108 to the base class library 10 of the managed code portion to the application program. In one embodiment, the UI controls 152 are managed in the native code portion 108.

Greater interoperability between networked computer devices and/or environments 100 allows the developers to enhance the user's experience. It also increases the acceptance of application programs using UI controls 152 that run on stand-alone computers and on such networks as the Internet, intranets, local area networks (LAN), and wide area networks (WAN). Providing interoperability between many different networked computer devices with different operating systems is desired, since many devices traditionally do not communicate or interface well. Additionally, it is desired to effectively display or handle data originating from different application programs that run on the same, or different, computers. As such, much of the data prepared by one application program or OS is then stored by many network servers, and can be considered "images" which should be able to be effectively used by another application program or OS.

The garbage collector acts on managed objects. Though a tree is removed from the operating system, there is still a reference to the tree, because that is where the data is stored. In multiple embodiments of the present system, the garbage collector is doing its cleanup within the native code portion and the operating system. As such, since there is no data remaining in the managed code portion, the garbage collector removes any reference to the managed objects.

In one embodiment, a virtual memory cache is located in the VM 202, which stores the system calls associated with one or more varied UI controls 152. The virtual memory cache can store UI controls as well as other control node data structures 654 that are often used by the computer environment 100.

UI controls 152 provide a UI mechanism by which users can input selections to the computer environment 100. A plurality of control node data structures are visualized, associated, and realized to eventually form the UI controls 152 as displayed on the computer display in the computer environment 100. The plurality of associated and visualized data structures can be batched into a representation of a single UI control that can be transferred between the managed code portion and the native code portion. Transferring a batched signal call including all of the UI controls limits the amount of data transferred between the managed code portion and the native code portion. In those instances where there are a considerable number of nodes (e.g. a thousand nodes) batched in a single, or a few, UI control such as a tree or a menu, considerable savings can be realized in the about of data traversing the VM/native boundary 260.

Figure 2:
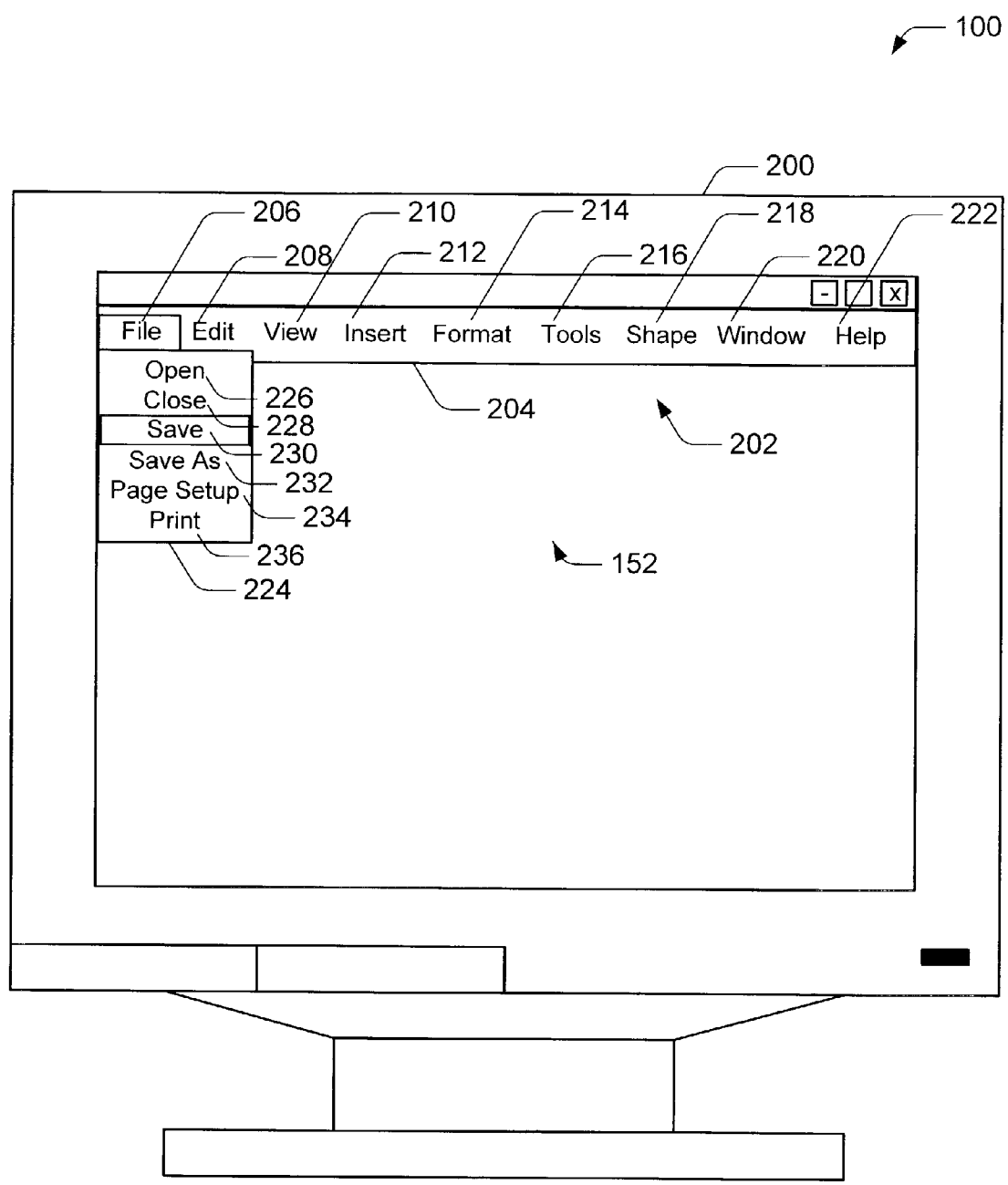
FIG. 2 illustrates a diagram of one embodiment of the UI control that may appear on a display of the computer environment.
Figure 3:
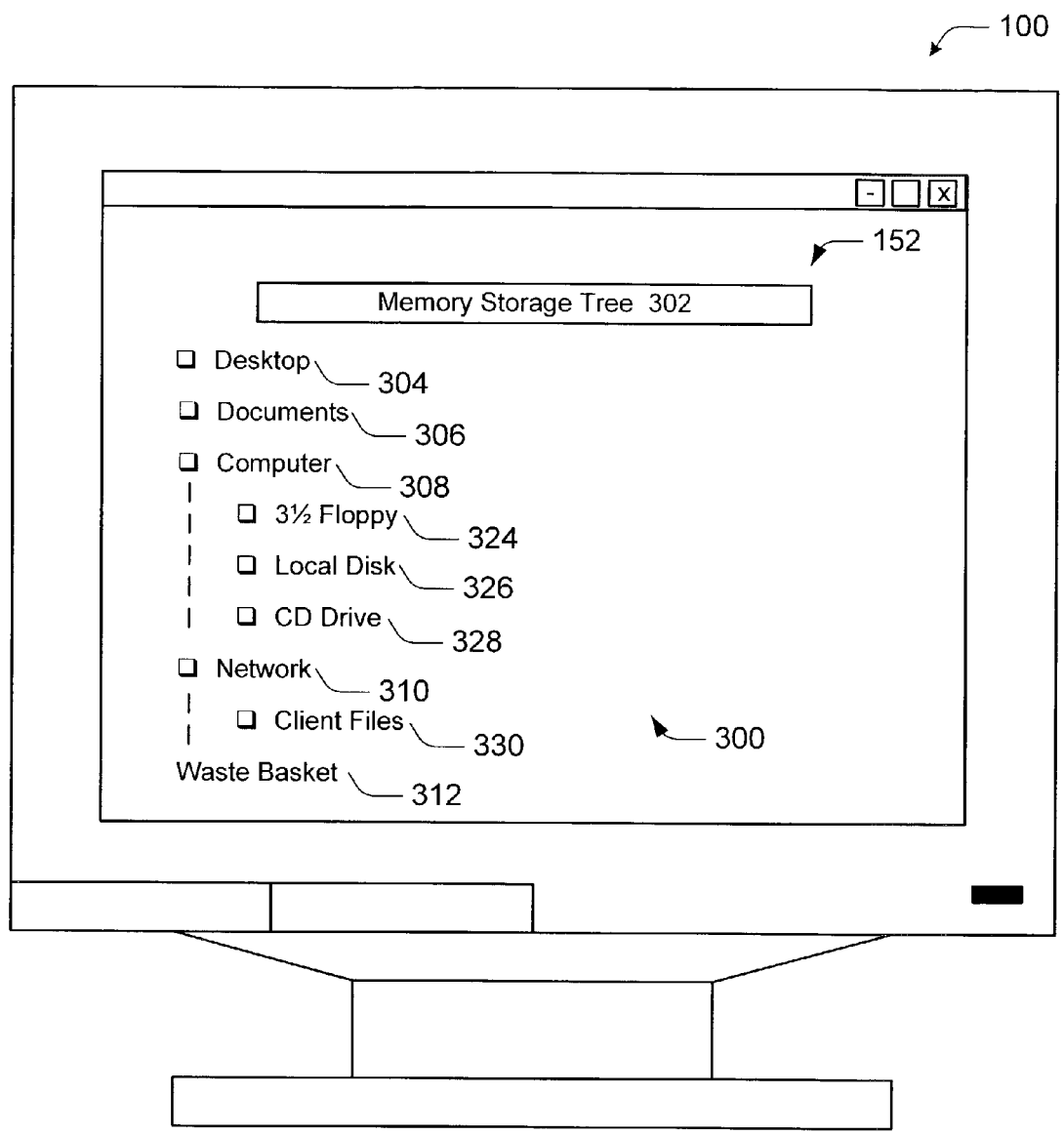
FIG. 3 illustrates a diagram of another embodiment of the UI control that may appear on the display of the computer environment.
Figure 4:
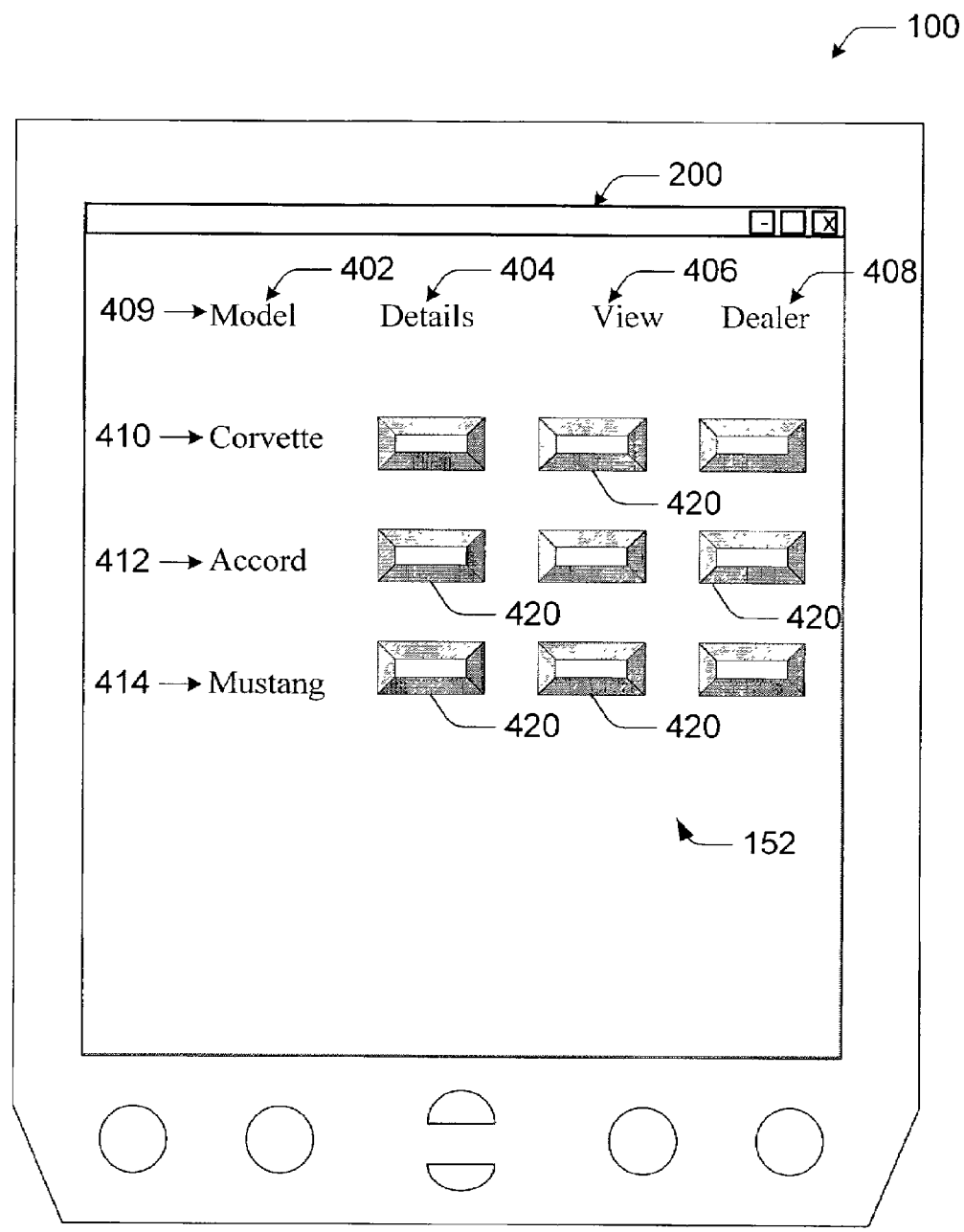
FIG. 4 illustrates a diagram of yet another embodiment of UI control that may appear on the display of the computer environment.

The UI control 152 includes such embodiments as menus, commands, trees, lists, tables, etc. by which the user can view information on the computer display 200 as shown in FIG. 9, and additionally the user can input data relating to the displayed UI control 152. The computer system 100 of FIG. 1 provides for the embodiments of UI control 152 as illustrated in FIGS. 2 to 4. Many varied embodiments of computer environment 100 can interface using these UI controls 152. For example, FIGS. 2 and 3 illustrate the UI controls 152 being displayed on the computer display 200 such as a monitor or flat panel display. FIG. 4, by comparison, illustrates the UI control 152 being displayed on a display such as is typical for a resource constrained device (e.g., a PDA).

The embodiments of UI controls 152 described herein provide a considerable benefit for users of such resource constrained devices as PDAs, embedded controllers, microprocessors, certain video games, and other devices that are known to have relatively small processors and/or memories. The UI control 152 concepts also can make such full sized computers as laptops, desktops, workstations, networked computers, and mainframes operate more quickly and reliably, and provide a more enjoyable user experience.

The UI (using the embodiment of UI controls 152 described herein) of the VM 202 can be configured to be small and performance oriented. The UI controls 152 accept the user inputs, and then determine what is to be displayed on the computer display 200 based on the user inputs, the application program, and the operating system. The design of UI is flexible to developers. The UI is designed to improve the performance, speed, and flexibility of the computer system. The simpler design allows developers to comply with platform guidelines more effectively.

The types of UI controls 152 that are integrated in the computer system are each applicable either to resource constrained devices or full-dimensioned computers. The computer environment 100 is provided with such UI devices as the computer display 200 and a user input device (such as a keyboard 534 and/or a mouse 536) as shown in FIG. 9 as described subsequently. FIGS. 2 to 4 illustrate a computer display 200 of the type as shown in FIG. 9, and on which various embodiments of UI controls 152 are illustrated. The basic components of the computer environment 100 are generalized, and are known to those skilled in computer technologies.

FIG. 2 illustrates one embodiment of a menu-based UI control 152. Such UI controls 152 are of the type programmed by a software designer for window-based computer programs (or in certain limited embodiments the user can program the UI controls 152). A menu 204, which forms a portion of the menu-based UI control 152, may be visible on the computer display 200 when a window-based operating system is running one of a variety of application programs (such as a word processor program, a spreadsheet program, a drawing program, etc.). The menu 204 includes a plurality of menu items or menu nodes including a file menu item 206, an edit menu item 208, a view menu item 210, an insert menu item 212, a format menu item 214, a tools menu item 216, a shape menu item 218, a window menu item 220, and a help menu item 222. The menu 204 defines the menu class, and all menu item controls that are contained in the menu 204. The menu 204 and the various menu items 206, 208, 210, 212, 214, 216, 218, 220, and 222 provide a portion of the user interface (UI) by which the user can select by moving a mouse (such as illustrated as 536 in FIG. 9) over the object and depressing the mouse button.

Selection of any one of the menu items 206, 208, 210, 212, 214, 216, 218, 220, and 222 on the menu 204 will result in display of a file child-menu item corresponding to the selected menu item 206, 208, 210, 212, 214, 216, 218, 220, or 222. For example, the inclusive file child-menu item 224 (that is displayed upon selection of the file menu item 206) includes an open file child-menu item 226, a close file child-menu item 228, a save file child-menu item 230, a save file as child-menu item 232, a page setup file child-menu item 234, and a print file child-menu item 236. Each child-menu item 226, 228, 230, 232, 234, and 236 applies to an action that is related to the associated menu item (in this case, the file menu item 206).

Each instance of the control node data structure 654 that is associated to form a UI control 152 is associated in at least one "parent" control node data structure (the control node data structure 654 is shown generally in FIGS. 5a to 5d as 654) and at least one "child" control node data structure 654. Examples of hierarchical UI controls 152 are menus, commands, and trees. Each child node is the same type as the parent node, and therefore inherits all of the characteristics of the parent node. The concept associating parent classes with child classes (or inheritance) is generally known in object-oriented languages and other computer languages. For example, in FIG. 2, the file menu item 206 is a parent-menu item of such child-menu items as the open file child-menu item 226, the close file child-menu item 228, etc.

Any parent-UI control/child-UI control relationship sets forth the hierarchical relationship. As such, the menu 204 provides the parent-UI control 152 that is inherited by the various menu items 206, 208, 210, 212, 214, 216, 218, 220, and 222 located on the menu 204. Each one of the menu items 206, 208, 210, 212, 214, 216, 218, 220, and 222 are parents of their respective UI control child-menu items (such as illustrated for the file menu item 206 as child-menu items 226, 228, 230, 232, 234, and 236). Parent-menu items and child-menu items, one embodiment of which is illustrated in FIG. 2, provide multiple examples of parent-menu UI controls and child-menu UI controls that, by definition, are hierarchically related. Due to the hierarchical relationship, each child-menu item 226, 228, 230, 232, 234, and 236 is by definition a file UI menu item 206. In addition, the file menu item 206, the edit menu item 208, the view menu item 210, the insert menu item 212, the format menu item 214, the tools menu item 216, the shape menu item 218, the window menu item 220, and the help menu item 222 are each a UI menu as a result of their inheriting the menu characteristics as a result of the hierarchical relationship with the menu 204.

Hierarchical relationships other than parent-menu items/child-menu items are within the scope of the present disclosure. For example, the parent-tree/child-tree relationship is also a hierarchical relationship since a parent-tree is hierarchically related to its child-tree. FIG. 3 illustrates one embodiment of a memory storage tree 300 displayed on the computer display 200. The memory storage tree 300 graphically displays a plurality of parent-tree/child-tree relationships. In certain embodiments, the highest level of the memory storage tree 300 includes a memory storage location 302. The memory storage location is the parent-tree to a desktop tree 304, a documents tree 306, a computer tree 308, a network tree 310, and a waste basket tree 312. Those trees 304, 306, 308, 310 that are parent-trees and have child-trees are illustrated by a box to the left of the name of the tree on the computer display 200, while those trees that have no child-trees have no box.

The computer tree 308 is a parent-tree to its child-trees including a 3½ floppy child-tree 324, a local disk child-tree 326, and a CD drive child-tree 328. The network tree 310 is a parent-tree to the client files child-tree 330. The memory storage tree 300 including its parent-trees and child-trees is intended to be illustrative in nature since any computer tree structure (and not only memory devices) can be associated in a hierarchical tree format. Parent-trees and child-trees are also useful in hierarchically associating child control node data structures 654 representing individuals and groups among parent control node data structures 654 representing organizations; hierarchically associating child control node data structures 654 representing locations among parent control node data structures 654 representing larger regions and/or countries; and hierarchically associating child inventory products relating among parent control node data structures 654 representing the product integrating the inventory products; and other similar hierarchical relationships.

There are a large variety of embodiments of hierarchical UI controls 152. Certain of these embodiments will be most commonly programmed by a developer. As such, the tree structure and the menu structure (with relative embodiments illustrated in FIGS. 2 and 3) each represent a hierarchical structure displayed on the computer display or monitor 200.

Another embodiment of associated UI control 152 is illustrated in FIG. 4. This embodiment of UI control 152 allows a user to select one of a plurality of controls that are associated in tabular form. In the FIG. 4 embodiment, there is one description column 402 and three control columns 404, 406, and 408. There is also one description row 409, and there are three control rows 410, 412, 414. For each intersection between one of the control rows 410, 412, 414 and one of the control columns 404, 406, and 408, there is at least one control node or item 420 that can be selected.

Selecting one of the control nodes 420 will cause some action to result. For example, if the user selects the control node 420 at the intersection between the row 410 and the column 404, then a description of a particular (i.e., Corvette) automobile appears. The description, when selected, may cover the entire computer display 200 or a portion of the computer display. If the user selects the control node 420 at the intersection between the row 410 and the column 406, then a view (e.g., digital image) of the automobile appears. If the user selects the control node 420 at the intersection between the row 410 and the column 408, then the dealer's address and contact information (or perhaps a web site associated with the dealer) is displayed. The particulars of what appears on the screen when the page is selected can be determined by the developer, or alternatively by the user.

During the process of managing UI controls 152 (including hierarchical, tabular, listed, and other UI controls 152 such as described above relative to FIGS. 2 to 4), there are a considerable number of processes relating to managing the data associated with the UI controls 152 that have to be accomplished prior to displaying the related data to the user. The term "managing" the UI control 152 includes such processes as virtualization, parenting, populating, and realizing as described herein.

Figure 5B:
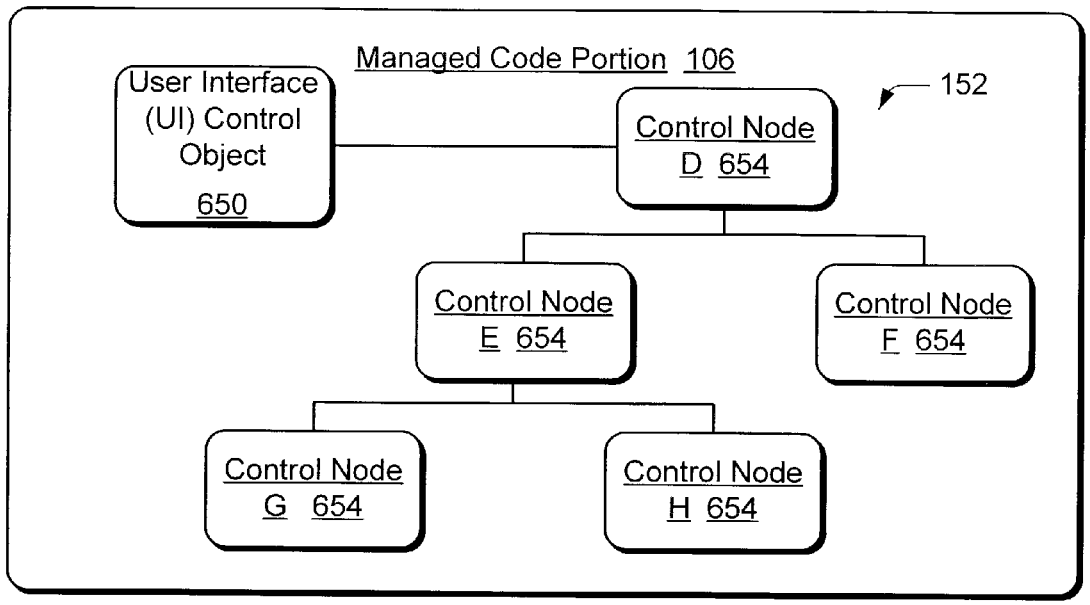
Figure 5B:
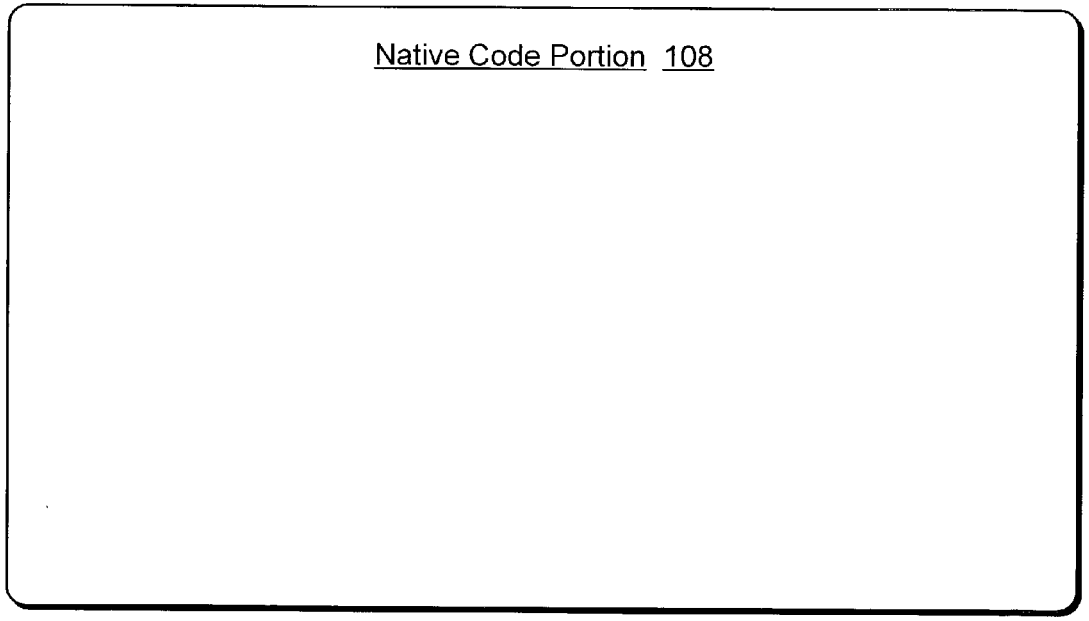

In one generalized embodiment, three events occur during the virtualization and realization process. Examples of a control object 650 as shown in FIG. 5a include managed UI control objects, menu control objects, command control objects, list control objects, and table control objects. A progressive system overview of these three events is illustrated in FIGS. 5a, 5b, 5c, and 5d. First, the control object 650 is created within the managed code portion. The control object 650 is consistent with the type of control involved (such as TreeView, Menu, Command, ListView, etc). As shown in FIG. 5a, the control object 650 is first created in the managed code portion 106 (which is consistent with the managed code portion in FIGS. 6a and 6b). At the time when the control object 650 is created, there is no data associated with the control object 650, the control object 650 instead provides a logical representation of the particular control.

The second event involves populating the control object 650 with one or more control node data structures 654. In FIG. 5b, a plurality of control node data structures 654 are created and associated with both the control object 650 and selected control node data structures 654. The plurality of control node data structures 654 are created and associated with both the control object 650 and selected other control node data structures 654.

Populating the control object 650 then occurs in the managed code portion 106 which involves the insertion of data (i.e. the control node data structures 654) relative to the populated control object 650, as well as creating the associations between certain ones of the control object 650 and/or the control node data structure 654. The associations set forth the operational relationships with the UI controls 152 located in the native code portion including the OS 526. The activities described in this paragraph are referred to herein as virtualization. Populating the control object 650 with control node data structures 654 does not cross from the managed code portion 106 across the VM/native boundary 260 into the native code portion 108 (or the operating system). The control object 650 is populated, but remains within the managed code portion 106, and can be modified without requiring any signal calls to be transmitted across the VM/native boundary 260.

Figure 5C:
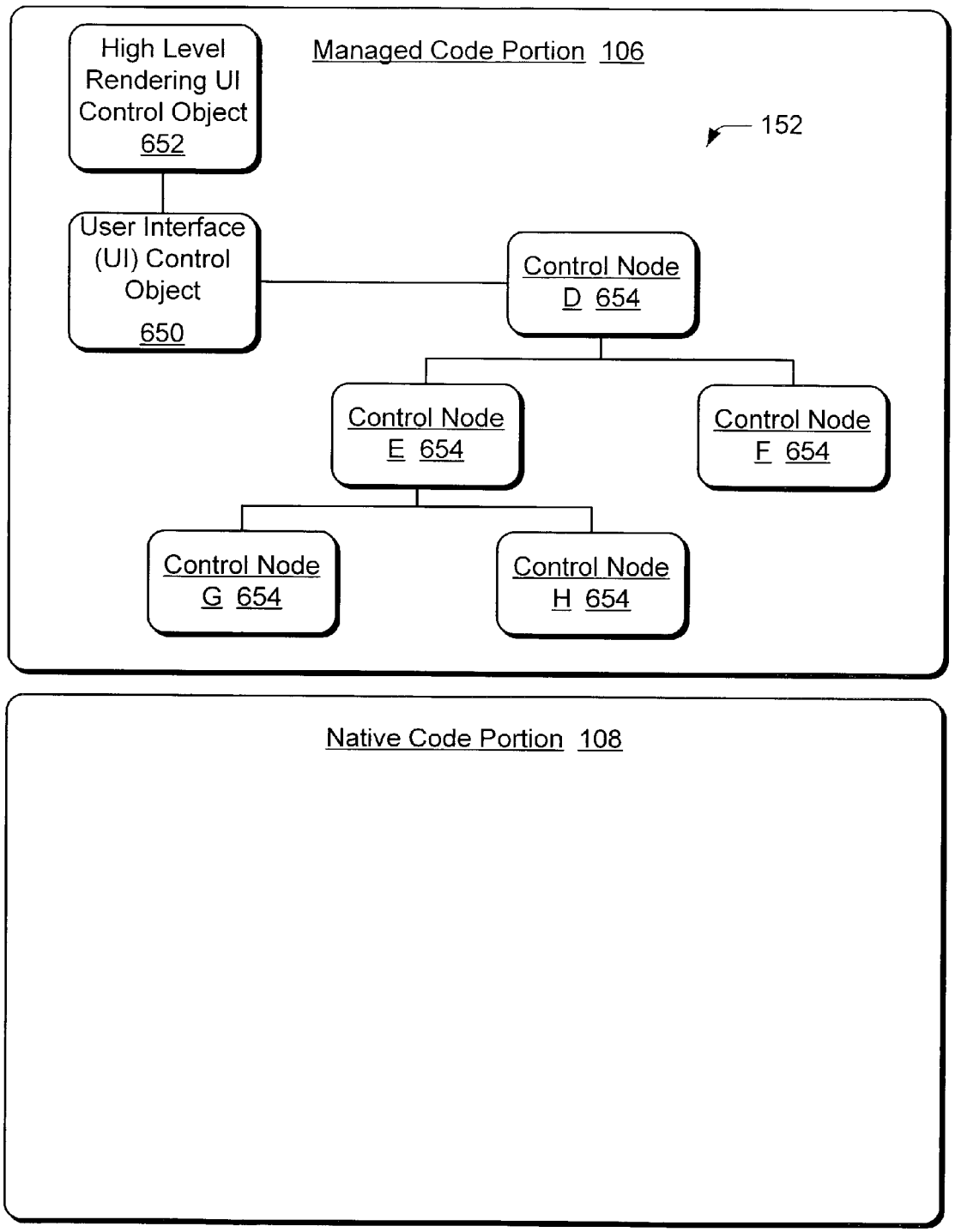
Figure 5D:
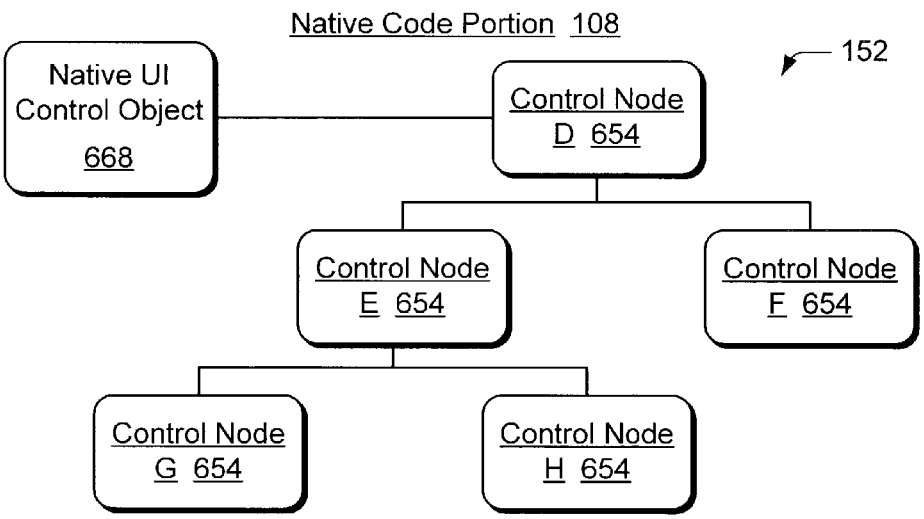

Another event involves placing the UI control 152 (associated as indicated by the associations between the control object 650 and/or the control node data structures 654) on a window, such that the window will be visualized as to be displayed on the computer display 200 in the computer display 200. This event may be considered as parenting the UI control 152 to a window. As shown in FIG. 5c, the control object 650 is parented to another UI object (in this instance a high level rendering control object 652 that can render objects on the computer display 200). During this event, the logical UI control 152 (including the high level rendering control object 652, the control object 650, and the associated control node data structures 654) migrates from the managed code portion 106 to the native code portion 108. As shown in FIG. 5d, the plurality of control node data structures 654 are migrated, along with the control object 650 and the high level rendering control object 652, to the native code portion 108. By this migration, the control object 650 and the high level rendering control object 652 are converted to a native UI control object 653 that is also capable of rendering on the computer display 200. In one embodiment, this migration can occur using a single signal call. During this process, the UI control 152 becomes realized in the AGL 112 as shown in FIG. 1, and eventually the OS 526.

In certain embodiments, these three events described in the last three paragraphs occur at run time, and as such require very little processor time. These three events may occur completely transparently to the user, so the first time the user is aware of these events is when the UI control 152 appears on the computer display 200. For instance, most application programs are provided with a menu that cannot be altered by the user. In other embodiments, the user can provide some input to alter the configuration and/or contents of the UI control 152. For example, users can alter an existing file manager application by adding new files or deleting files.

There is a distinction between the UI control 152 including creating a control object 650 or the associated control node data structures 654, and being able to observe the controls on the computer display 200 of the computer environment 100. The control node data structure 654 that is created is in the managed code portion and is not displayed until it is transitioned into the native code portion and the operating system where it is realized. The logical control node data structure 654 is created in, exists in, can be modified in, but not displayed within, the managed code portion.

Managing UI controls 152 therefore include such processes as virtualizing, populating, parenting, and realizing. Virtualizing UI controls 152 involves creating the associated control object 650 and the control node data structures 654 (within the managed code portion 106) that can eventually be migrated to render UI controls 152 within the native code portion 108. The UI controls 152 that are used in rendering in the native code portion (menus, commands, trees, multi-column lists, etc.) will maintain a stored representation of the UI control object 653 and the associated control node data structure 654 in the managed code portion. The UI controls 152, when in the managed code portion, are said to be virtualized since their only representation exists in the managed code portion 106. The process of visualizing a child UI control 152 is equated to creating the UI control 152 from an existing UI control having existing control node data structures 654.

Once a parent control node data structure 654 is created and associated with the control object 650, other children control node data structures 654 can be created and associated with that parent control node data structure. The parenting process between parent control node data structures 654 and children control node data structures 654 associates the different control node data structures to each other in a manner that reflects the hierarchical structure. For instance, the parent control node data structures 654 will be associated with their respective child control node data structures 654. For the UI control 152 to be realized, and thereupon rendered to the screen, the child control node data structure 654 is parented by a parent control node data structure that is already realized. The UI control 152 can be realized by having the control object 650 existing at high level form that is able to realize and render the object. Alternatively a control node data structure 654 can be associated with a previously realized UI control 152 using re-virtualization.

Virtualization and parenting of the UI control 152, in this embodiment, occur in the managed code portion 106. The UI control 152 can then migrate to the native code portion and OS to be realized. Following parenting, the control node data structure 654 is transitioned to native code through the creation of a parallel native structure. Next, hard links between the managed and native data are created and maintained during the period of time when the UI control 152 is realized. The hard links are created when the object is realized into the native layer. The links bind the managed object and its native counterpart. The links are broken when the object is virtualized and the native object is destroyed.

Realization of a UI control 152 occurs following a signal call traveling from the managed code portion to the native code portion, when the UI control 152 is read into the AGL (in the native code portion), and subsequently the OS 526. Data associated with the control is stored in several locations, depending on whether the control is realized or not. In existing systems, data is stored in the managed code portion 106, the native (AGL) code portion 108, and the OS 526. In one embodiment of the computer environment 100, the data migrates. The most efficient technique is to store all of the data associated with a linked UI control 152 in only one location (such as the native code portion). In one embodiment as presently disclosed, this data migration/transition occurs when the tree is realized.

It is possible for segments of the data to be virtualized, then realized, then virtualized, then realized again. This process is referred to herein as re-virtualization. For example, in a UI control 152 that displays a tree of data, a process can be followed including, e.g., a) a child node can be removed and the UI control 152 is virtualized; b) additional data can be added to the child node, and the child node thereby populated; and c) the child node can be realized again in a modified form by parenting it to an already realized node. The benefit of such an operation is that the hard links need not be created, maintained, and updated during the population phase. Only when the new child-tree becomes re-parented does the parallel native structure get created, resulting in the hard links being created and maintained. This process reduces the traffic across the VM/native boundary 260 (since only one signal call is required for each UI control 152 traveling either direction across the VM/native boundary 260) resulting in increased performance, especially in resource constrained devices.

Figure 6A:
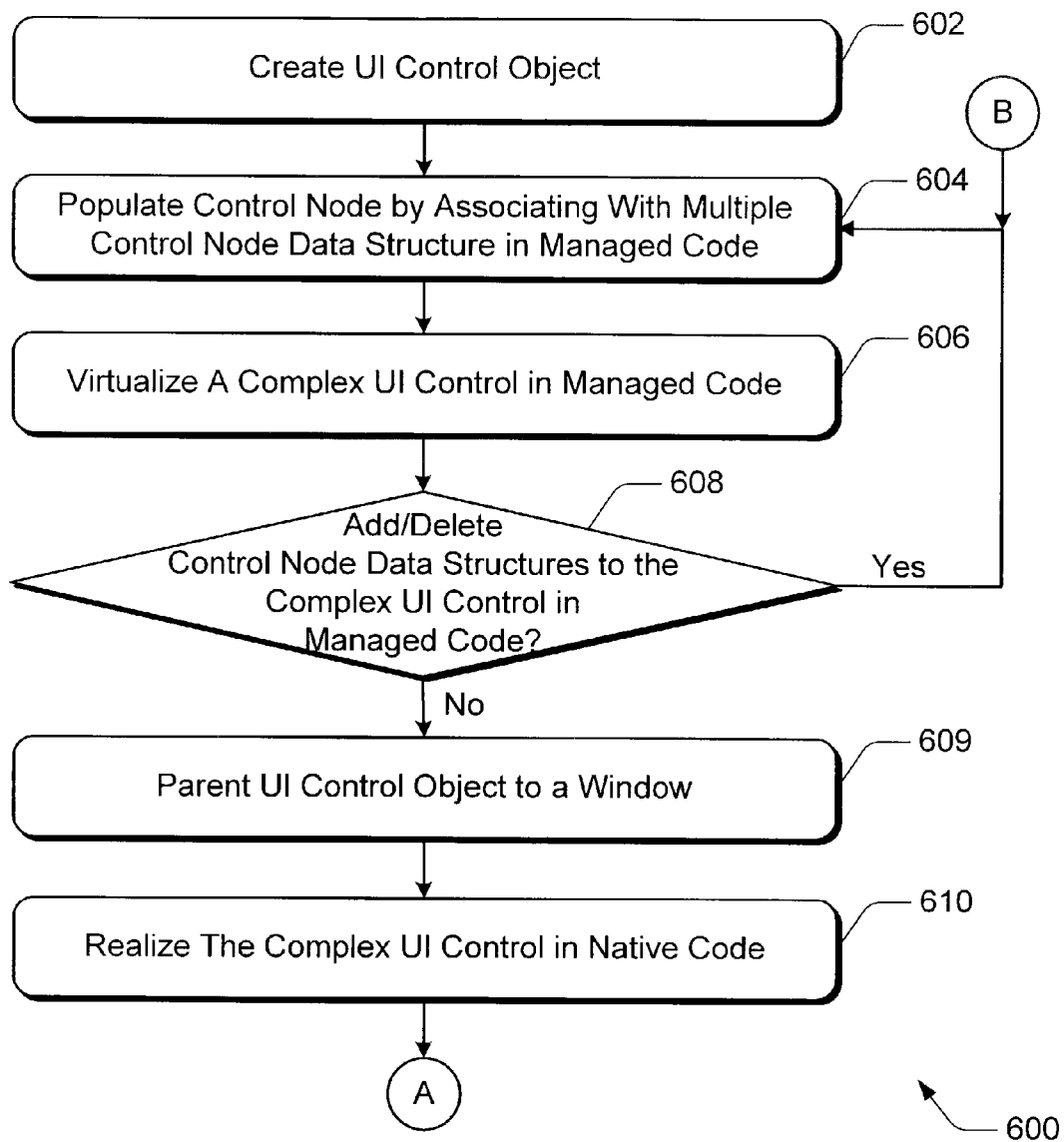
FIGS. 6a and 6b illustrate a flow diagram of one embodiment of a virtualizing and realizing method such as would be used to generate a UI control such as illustrated in FIGS. 5a, 5b, 5c, and 5d.
Figure 6B:
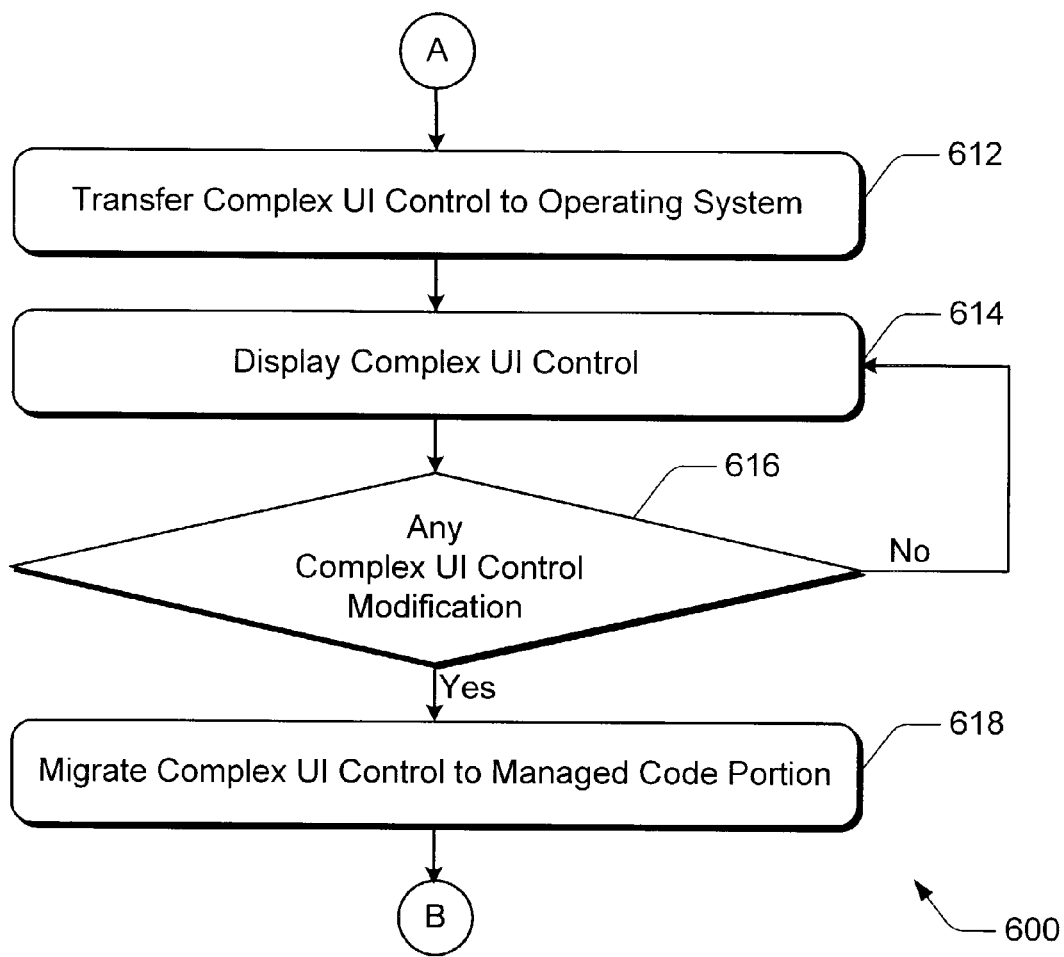

FIGS. 6a and 6b illustrate one embodiment of a virtualizing and 19 realizing process 600, in which the control node data structures 654 (associated in hierarchies, lists, tables, etc.) are virtualized to form UI controls 152, and the control node data structures are then realized. The virtualizing and realizing process 600 starts with 602 in which the control object 650 is created. The control object 650 is configured to migrate between the managed code portion 106 and the native code portion 108. The control object 650 is the same basic type as the UI control 152 which is going to be created. If the desired UI control 152 includes a menu, then the control object 650 also includes a menu.

The virtualizing and realizing process 600 continues to 604 in which an appropriate number and type of control node data structures 654 are created and/or destroyed to ultimately form the UI controls 152. The control node data structures cannot by themselves migrate between the managed code portion 106 and the native code portion 108, but when they become associated with the control object 650, they can migrate with the control object 650 between the managed code portion 106 and the native code portion 108 as a portion of a virtualized UI control 152. 604 is considered as populating the control object 650 which is necessary to form the UI controls 152.

Next, in 606 the UI control 152 is virtualized by associating the different multiple control node data structures 654 in the desired form. For example, in hierarchical UI controls 152, a parenting process is used to determine which control node data structures 654 are configured as parents to certain other control node data structures. In linear UI controls 152, the multiple control node data structures 654 are associated as desired in tabular or linear form to virtualize the UI control 152. This virtualization of UI controls 152 is performed within the managed code portion. As such, no signal calls that extend across the VM/native boundary 260 are necessary to virtualize a UI control 152.

The virtualizing and realizing process 600 shown in FIGS. 6a and 6b continues to decision 608 in which it is determined whether any control node data structures 654 should be added or deleted prior to forming the UI controls 152. Since the control node data structure 654 is maintained within the managed code portion 106 following virtualization, the configuration of the UI control 152 can be virtualized, modified, and then re-virtualized without having any further signal calls traverse the VM/native boundary 260. If the answer to decision 608 is yes, indicating that at least one association within the UI control 152 is to be modified, then the process 600 continues to 604 in which the desired control node data structure(s) 654 is added and/or removed relative to the UI control 152. The UI control 152 is thereupon to be re-virtualized with the desired associations (i.e., links).

If the answer to decision 608 is no, then the process 600 continues to 609 in which the control object 650 is parented to a window. The method continues to 610 in which the UI control 152 is realized. The UI control 152 has to be migrated to the native code portion 108 for it to be realized. In one embodiment, only a single signal call is necessary to migrate the UI control 152 from the managed code portion 106 to the native code portion 108. Since the control node data structures 654 within the UI control 152 are associated with the control object 650, the entire UI control 152 can be migrated as a single unit across the VM/native boundary 260. By comparison, traditional controls, which are both virtualized and realized in the native code portion, require a single signal call to transfer each data structure 654 forming a control. This reduction in the number of signal calls used to migrate the UI control 152 is especially important for resource constrained devices.

The virtualizing and realizing process 600 continues to 612 in which the UI control 152 is transferred from the native code portion 108 to the operating system 526 as shown in FIG. 1. A signal call is used to transition the UI control 152 between the native code portion 108 and the operating system 526. Note that the native code portion 108 and the operating system communicate using the same computer language, and therefore the transition between the native code portion and the operating system is configured to transfer data effectively. Therefore, the transition between the native code portion and the operating system should be more effective (and less processor expensive) than the transition at the VM/native boundary 260 between the managed code portion 106 and the native code portion 108.

The virtualizing and realizing process 600 continues to 614 in which the UI control 152, as realized in the native code portion 108, is displayed over the computer display 200 of the computer environment 100. The display of the UI control 152 will be consistent with the different associations among the controls contained within the UI control 152. For instance, as illustrated in FIG. 2, the open file child-menu item 226, which is a child control of its parent control, the file menu item 206, will be displayed within the computer display 200, and act based on user input in a suitable manner.

The virtualizing and realizing process 600 continues to decision 616 in which it is determined whether there is any further modification to the UI control 152. Since the UI control 152 is being displayed from the OS 526, any modification to the UI control 152 which is to be performed in the managed code portion 106 necessitates that the UI control be migrated across the VM/native boundary 260. If the answer to decision 616 is yes, then the process 600 continues to 618 in which the UI control 152 is migrated from the OS 526 via the native code portion 108 to the managed code portion 106. Following 618, the process 600 continues to 604 as described above.

If, by comparison, the answer to decision 616 is no, then the virtualizing and realizing process 600 continues to 614, and the UI control 152 is continued to be displayed on the computer display 200. As such, 614 and 616 can be considered to form a loop in which the process 600 remains if no modification is to be performed to the UI control 152.

To illustrate one embodiment of implementing the virtualizing and realizing process 600 as illustrated in FIGS. 6a and 6b, the following pseudocode (when read in combination with FIGS. 7a to 7f) provides for the process of virtualizing, populating, parenting, and realizing UI controls 152 based on the computer software (pseudocode) commands. Similar coding can be applied to trees, menus, commands, other hierarchical controls, list controls, linear controls, and other controls where a plurality of control node data structures are associated.

FIGS. 7a to 7f display a progression that is followed to create and display of one UI control 152 that is formed from a plurality of control node data structures 654 that are illustratively labeled as "A", "B", and "C". Certain ones of the control node data structures 654 are associated/linked by hierarchical associations (i.e., hard links) 710, 714, and 716. The line number ("ln") is used to describe a particular line in the following pseudocode routine as illustrated in Table I.

TABLE I

//Create a tree control (which can be any UI control 152)
ln1. Tree t = new tree;
ln2. Treenode a = new tree node ("A");
ln3. Treenode b = new tree node ("B");
ln4. Treenode c = new tree node ("C");
ln5. a.addchildnode(b);
//realize the tree TABLE I-continued

```
ln6. t.addnodes(a,c);
//virtualize the tree, the term "node" applies to control node data
//structures
ln7. Screen.Add(t);
ln8. Screen.Remove(t);
//t still points to the managed tree
```

Figure 7A:
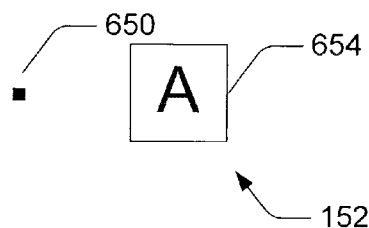
FIGS. 7a, 7b, 7c, 7d, 7e, and 7f illustrate one embodiment of the progression of virtualizing and realizing the UI control to be performed in the computer environment illustrated in FIG. 1.

Consider the progression of ln1 to ln8 as illustrated in FIGS. 7a to 7f. In ln1, a new managed UI control object 650 is created as illustrated in FIG. 7a. In ln2, a new tree node or control node data structure A 654 is created that is displayed adjacent to the managed UI control object 650 in FIG. 7a. There is no association between the control node data structure A 654 and the managed UI control object 650 at this stage.

Figure 7B:
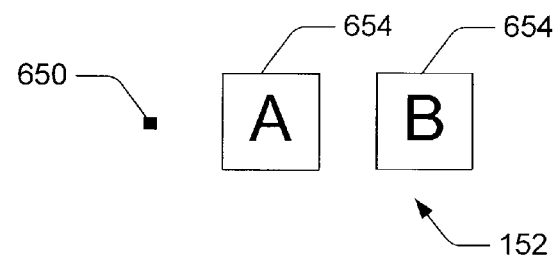
Figure 7C:
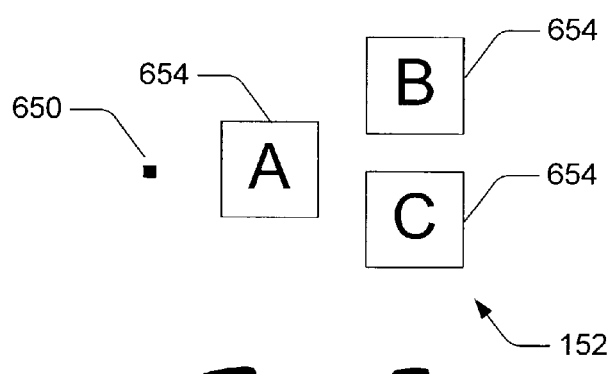

In ln3, a new tree node or control node data structure B 654 is created that is displayed adjacent to the managed UI control object 650 and the control node data structure A 654, as illustrated in FIG. 7b. There is no association between the control node data structure A 654, the control node data structure B 654, and the managed UI control object 650 at this stage. In ln4, a new tree node or control node data structure C 654 is created that is displayed adjacent to the managed UI control object 650, the control node data structure A 654, and the control node data structure B 654 as illustrated in FIG. 7b. There is no association between the control node data structure A 654, the control node data structure B 654, the control node data structure C 654, and the managed UI control object 650 at this stage.

At this stage, all of the UI controls 152 including the control node data structure A 654, the control node data structure B 654, and the control node data structure C 654 have been created. In addition, the characteristics of the control node data structure A 654, the control node data structure B 654, and the control node data structure C 654 have each been set forth as children UI controls 152 based on the characteristics of the managed UI control object 650 which is a parent UI control 152.

Figure 7D:
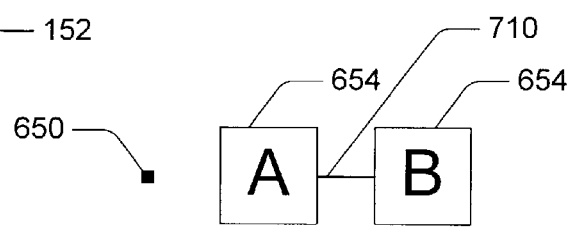

In ln5, realization occurs as the associations between the various control node data structures 654 commences because ln5 creates a hierarchical association 710 (e.g., a link) between the control node data structure A 654 and the control node data structure B 654 as illustrated in FIG. 7d. The control node data structure A 654 thus becomes the parent UI control 152 relative to the control node data structure B 654 (which in turn becomes the child UI control). The associations between different ones of the control node data structures 654 can be modified at this time without any effect on the native code portion since representations of the relevant control node data structures are stored only in the managed code portion, in certain embodiments.

Figure 7E:
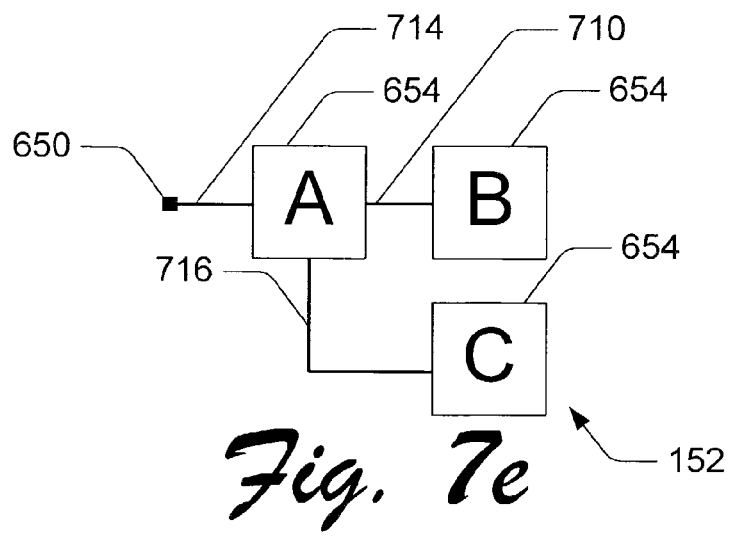

In ln6, the tree UI control 152 is realized by adding the control node data structures A and C (and also the control node data structure B 654 that is associated with the control node data structure A 654 in ln5) to the managed UI control object 650. As a result of this command, the control node data structure A 654 is associated with the parent managed UI control object 650 as illustrated in FIG. 7e. Additionally, the control node data structure C 654 is associated (with link 716) as a child of the parent-control node data structure A 654. Based on the realization of the tree UI control 152, the tree UI control 152 is migrated from the managed code portion 106 to the native code portion 108.

During the migration resulting from ln6, the entire tree UI control 152 (including the managed UI control object 650 and the control node data structures A, B, and C) are migrated as a single entity using a single signal call from the managed code portion 106 to the native code portion 108. The tree UI control 152 is realized using a just-in-time (JIT) compiler that is compiled once for the tree UI control 152. In typical prior-art systems by comparison, the managed UI control object 650 as well as each one of the control node data structures A, B, and C are each migrated from the managed code portion 106 to the native code portion 108 using distinct signal calls, and in the prior-art systems, each one of the managed UI control object 650 and each one of the control node data structures A, B, and C have to be separately compiled and associated in the native code portion 108.

Figure 7F:
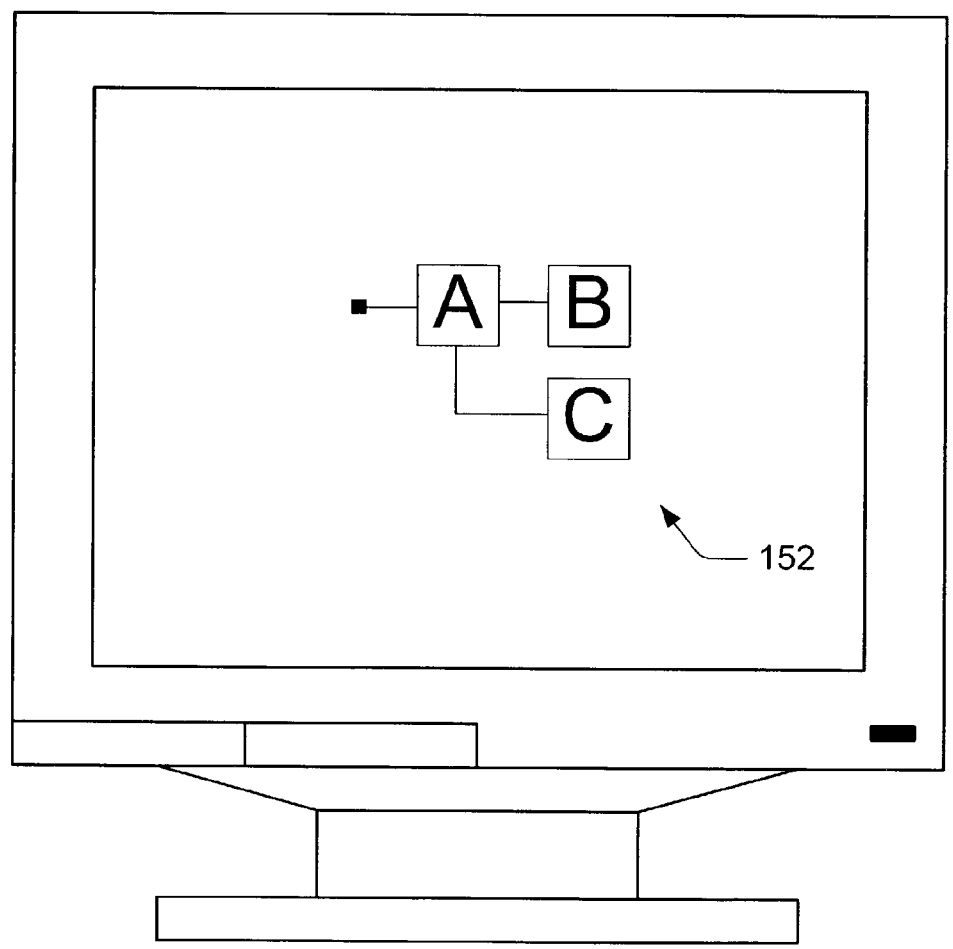

In ln7, the tree UI control 152 is displayed on the computer display 200 of the computer environment 100 as illustrated in FIG. 7f. The display of the tree UI control 152 using the ln7 command displays the tree UI control 152 exactly as realized in ln6. The associations 710, 714, and 716 are symbolic and are not physically displayed on the computer display 200. Even if the tree UI control 152 is removed from the screen as per command ln8, the managed UI control object 650 still points to the UI control 152 that is contained in the managed code portion 106.

FIGS. 8a, 8b, 8c, 8d, and 8e illustrate one embodiment of a re-virtualization process. The re-virtualization process allows a UI control 152, which has already been realized, to be modified by the addition and/or deletion of one or more control node data structures 654 (and the respective associations), and/or the changing of an association for one or more control node data structures 654 relative to other control node data structures 654 and the control object 650. One exemplary embodiment of re-virtualization process is illustrated. Any embodiment of revirtualization process, in which the arrangement between one or more control node data structures 654 is modified, is within the intended scope of the present invention.

Figure 8A:
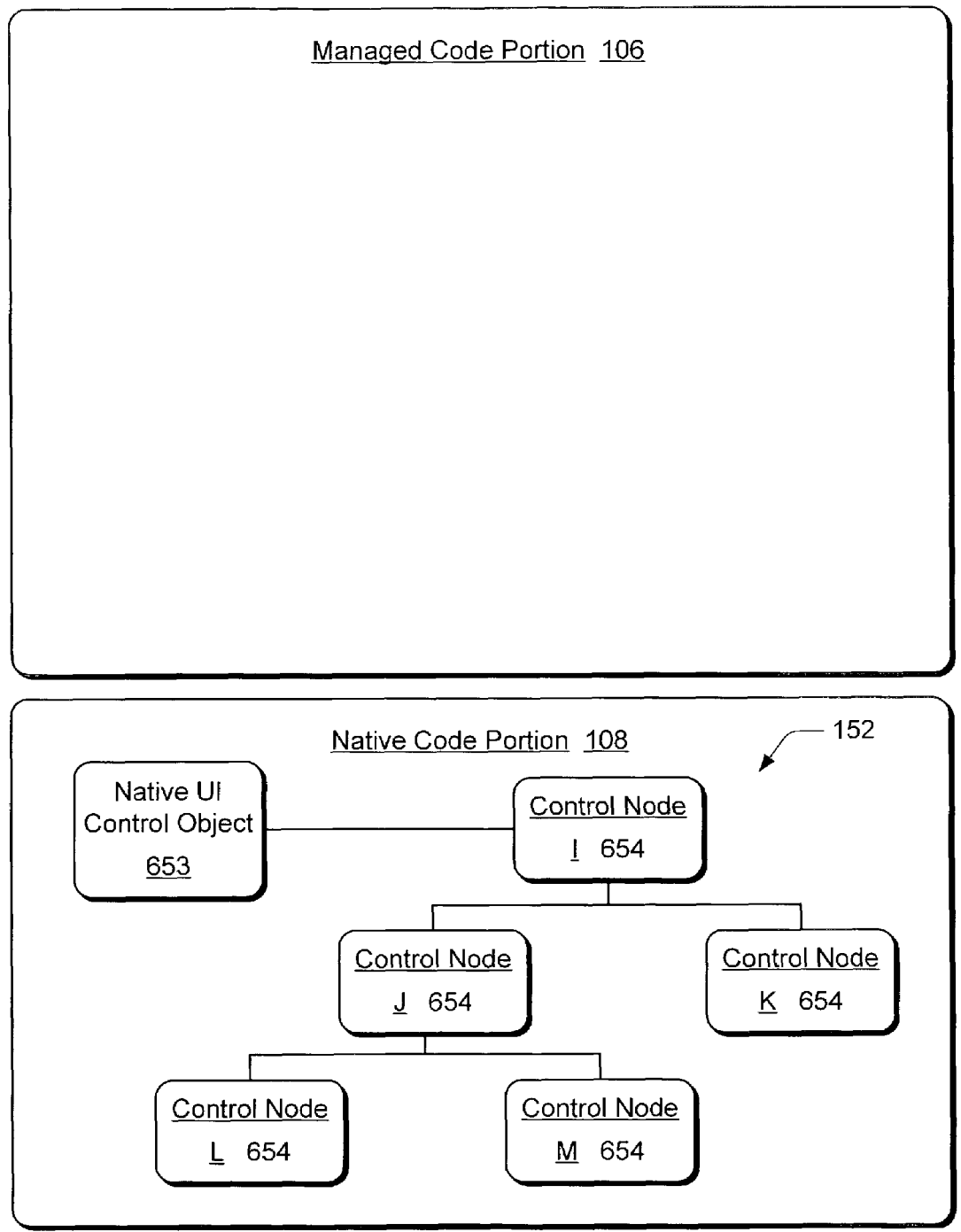
FIGS. 8a, 8b, 8c, 8d, and 8e illustrate a block diagram of one embodiment of re-virtualizing and realizing the UI control to be performed in the computer environment illustrated in FIG. 1.
Figure 8B:
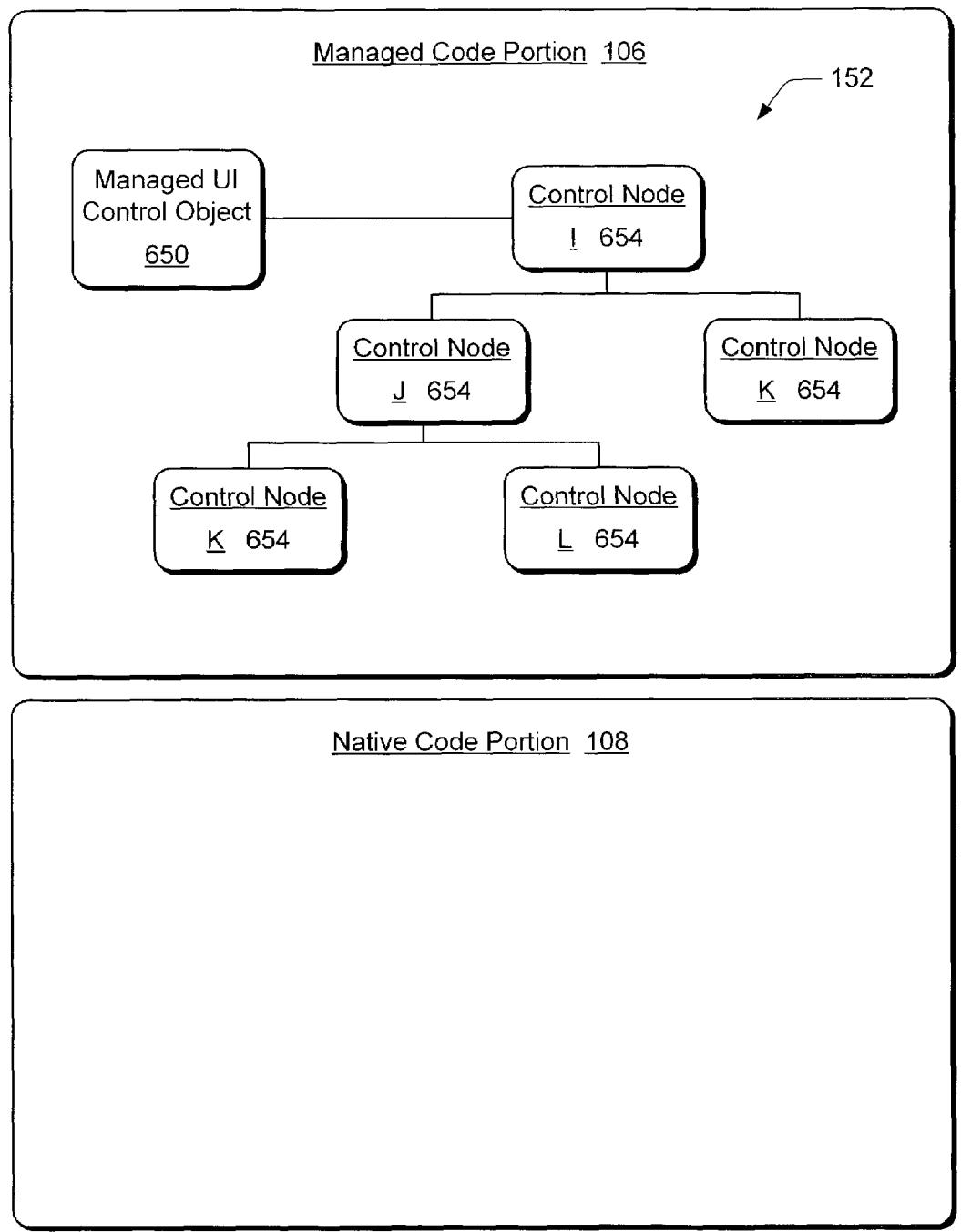
Figure 8C:
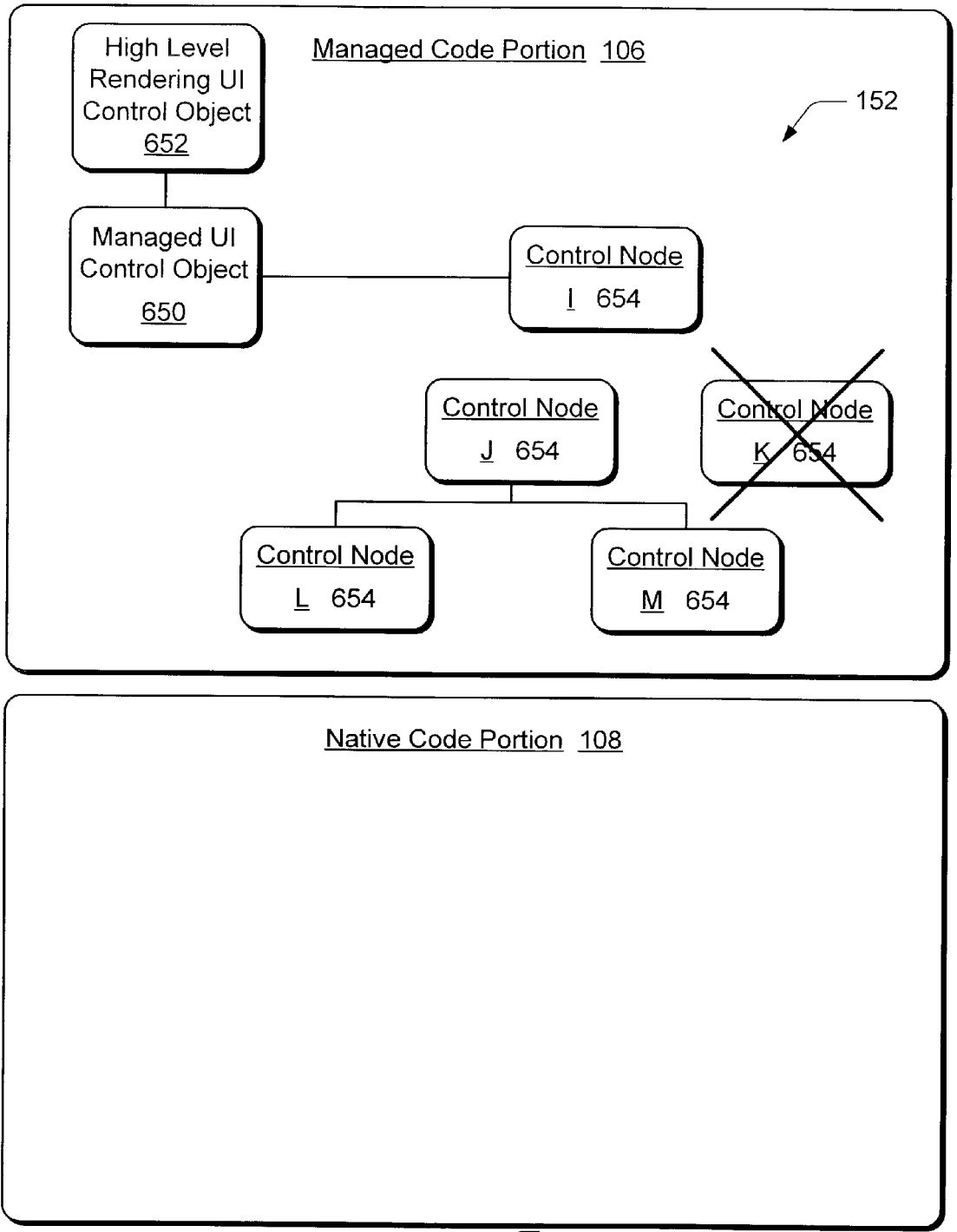
Figure 8D:
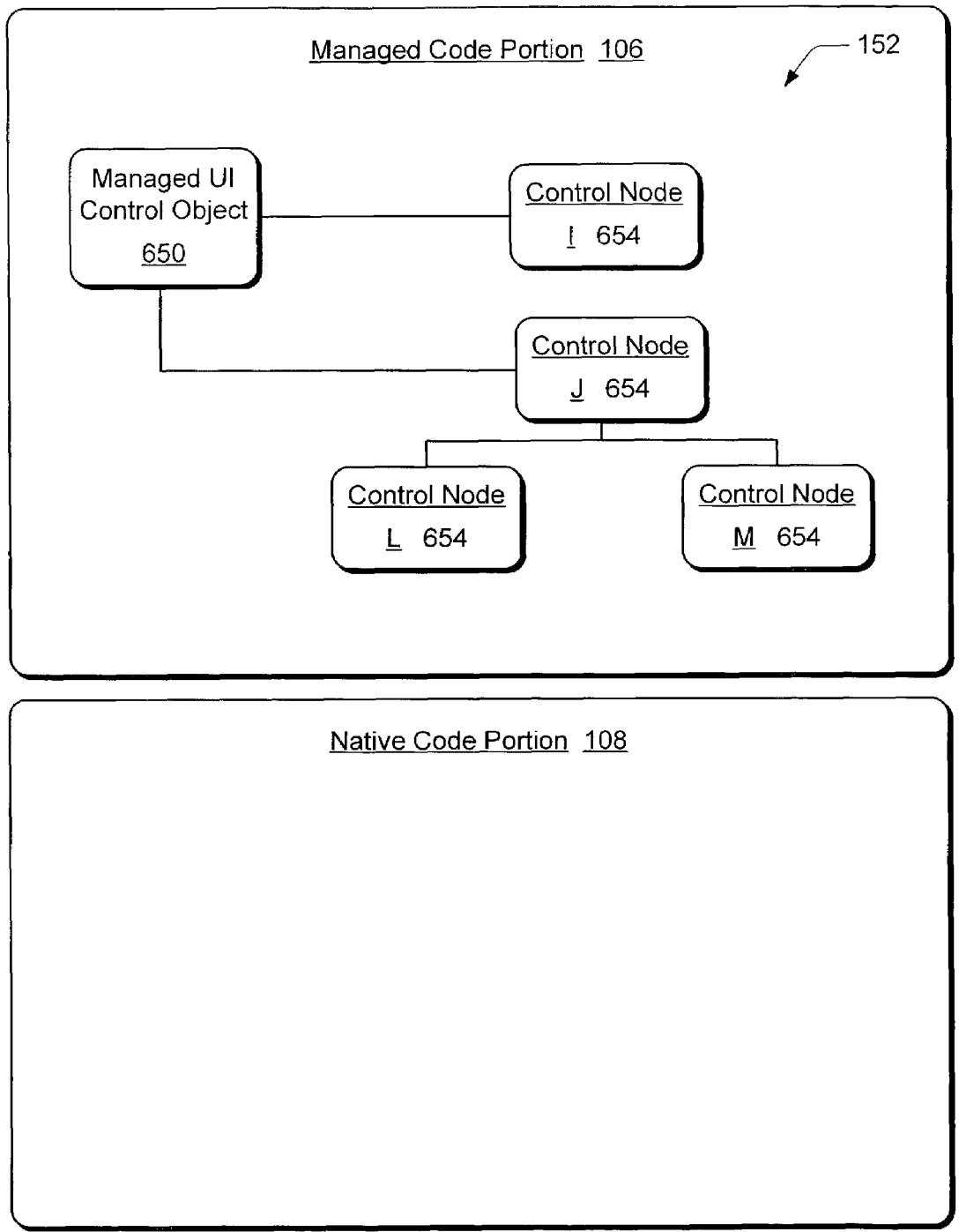
Figure 8E:
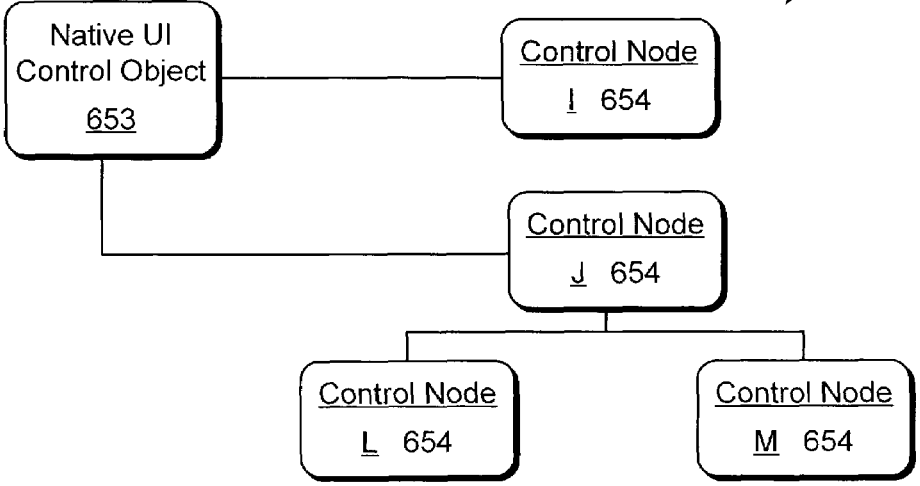

There are four events that occur in one embodiment of the re-virtualization process. The first event is that the UI control 152 is built up in managed code and realized through parenting. FIG. 8a illustrates the UI control 152 within the native code portion 108. When the UI control 152 is to be modified, the UI control 152 is migrated from native portion 108 to managed code portion 106. FIG. 8b shows the UI control 152 after being migrated from the native code portion 108 to the managed code portion 106. Note that in FIG. 8b, the control node data structure J 654 is illustrated as the child of the control node data structure I 654, and the parent of the control node data structure M 654.

The second event is that a child control node data structure 654 is detached in the managed code portion. For instance, in FIG. 8c, the control node data structure J 654 is illustrated as de-parented from the control node data structure I 654. Additionally, the control node data structure K 654 is de-parented from the control node data structure I 654 (or alternatively the control node data structure K 654 is simply deleted or de-parented from the control node data structure I 654). Additionally, the control node data structure I 654 is de-parented from the control object 650. The additional child control node data J structure 654 is parented directly to the managed UI control object 650 (or alternately may be attached to another child control node data structure 654). For instance, in FIG. 6D, the managed UI control object 650 causes the newly parented control node data structures 654 (including all the children control node data structures) to be realized. In one embodiment, the stack of the VM is used to accomplish this parenting/re-parenting.

One embodiment of a managed execution process that is performed by the computer environment 100, including the managed code portion 106 and the native code portion 108 as shown in FIG. 1, to virtualize, populate, parent, and realize a UI object 152 includes the following:

a) Choose a compiler to associate with the application program 102. To obtain the benefits provided by the common language runtime, a developer can select one or more language compilers that target the runtime.

b) Compile the code to an intermediate language (e.g., Microsoft intermediate language) code. This compiling translates the source code into the intermediate language, and also generates associated metadata. The intermediate language is a CPU-independent set of instructions that can be efficiently converted to the native code. The intermediate language includes instructions for loading, storing, initializing, and calling processes on control objects 650, as well as instructions for arithmetic and logical operations, control flow, direct memory access, exception handling, and other operations. The metadata describes such parameters as the types in the code, including the definition of each type, the signatures of each type's members, the members that the code references, and the data that the runtime uses at execution time.

c) Compile the intermediate level code into the native code. The native code portion 108 creates a native draw resource from a managed assembly and installs it into the native code portion 108 on the local computer. A native draw resource that is a file containing, compiled processor-specific machine code is produced.

In one embodiment, at execution time, the just-in-time (JIT) compiler in the native code portion 108 translates the intermediate language into the native code. During this compilation, the code passes a verification process that examines the intermediate language code and metadata to find out whether the code can be determined to be type safe. Before the intermediate language can be executed, it must be converted by the just-in-time (JIT) compiler of the network framework 104 into the native code. The native code is a CPU-specific code that runs on the same computer architecture as the JIT compiler. Developers can write a set of instructions for the intermediate level language that can be JIT-compiled and executed on computers with different architectures. The managed code portion 106 will run only on a specific operating system if it calls platform-specific, native application programming interfaces (API), or a platform-specific class library.

d) Execute the code. The common language runtime provides the infrastructure that enables the code execution (as well as a variety of services that can be used during execution) to take place to realize the UI object. Before a process can be executed by the computer environment, it must be compiled to processor-specific code. Each process for which the intermediate language has been generated is JIT-compiled when it is called for the first time, and then executed. The next time the process is executed, the existing JIT-compiled native code is executed. The process of JIT-compiling and then executing the code is repeated until execution is complete.

During execution, the managed code portion 106 receives services such as automatic memory management, security, interoperability with unmanaged code, cross-language debugging support, and enhanced deployment and versioning support. After a native draw resource is generated for an assembly program, the runtime automatically attempts to locate and use this native image each time it runs the assembly. If the managed code portion 106 is unable to find a suitable native image, the runtime reverts to a standard compiled program.

In a resource constrained computer environment (e.g., certain networks and OS), reducing the number of resources used and increasing the efficiency and retrieval rate of data is important. Certain OS architectures, such as .NET and JAVA, involve the use of VMs 202 (or managed code portions 106) that are capable of interfacing with the software from more than one native machine (or native code portion 108). When executing code in the environment of the managed code portion 106, the user interface (UI) components often represent control node data structures 654 that typically require native resources to be allocated to realize the UI controls 152. Executing code in the native code portion 108 reduces the necessity for synchronization as described in the background.

The user interface of the VM 202 is intended to be small, and performance directed as to user input and how it inputs on the screen, and flexible to developers. The relatively small size, and somewhat simplified operation, of the resource constrained devices permit the designers to program effectively, and in a manner that complies with platform guidelines.

When executing code in the managed code portion 106 (i.e., the VM environment), the UI libraries commonly call through to the native code portion 108 to perform low level functionality such as UI controls 152 and window management. In such systems, UI controls 152 within the native code portion 108 are allocated based on one or more UI library calls. When the managed code portion 106 is finished with the resource, the UI control 152 must then be freed.

In one aspect, it would be desirable to store the codes (i.e., calls) of the UI control 152 that are transmitted to the native code portion 108 in a VM managed memory included in the managed code portion 106, such as cache memory. The code representing the UI controls 152 should be stored as native code in the native code portion 108 using a computer language such as XML. XML is desired because it allows different application programs to display, organize, program, edit, and transfer data relating to UI controls 152 between different web devices and application programs while maintaining the ability to maintain the data characteristics.

Even with the more powerful computers, it would still be desirable to follow good programming techniques to diminish the number of system calls to make the computers run faster and more reliably, thereby increasing the user's enjoyment and use of such application programs.

XML separates the underlying data from the manner in which the data is displayed (and which may be controlled by the user). The data relating to the UI controls 152 may be accessed and "unlocked" by each web device so that the underlying program may be displayed, organized, programmed, edited, and transferred between web devices. Additionally, the web device that accesses the data can format to display the underlying data as desired.

This disclosure provides a mechanism for managing hierarchical and linear UI controls 152. The embodiments provide a mechanism for the control node data structures 654 associated with these UI controls 152 to be virtualized (live only in managed code) and realized (represented in a native structure). This process reduces the number of native OS resources necessary to render a given UI and reduces the calls across the VM/native boundary 260 resulting in efficiency and speed increases. As such, no synchronism is necessary between the different copies.

When executing code in a VM 202, such as may run on the computer environment 100 shown in FIG. 1, the user interface (UI) components often represent control node data strictures 654 for UI components such as the trees, lists, commands, and menus (which depend respectively on such classes as TreeView, ListView, CommandView, and Main-Menu). In such systems, native resources are allocated to realize the control objects 650. These native resources are maintained synchronized with their managed code counterpart in the VM 202. When the VM 202 is through using the resource, the resource is then freed.

The UI control process, the tabular UI control process, and associated 11 apparatus provide a mechanism for managing hierarchical or tabular UI controls 152. The hierarchical UI control process provides a mechanism for the control node data structures 654 associated with these UI controls 152 to be virtualized, and therefore the control node data structures 654 and their associated UI controls 152 are represented only in managed code. Additionally, the hierarchical UI control process provides a mechanism for the control node data structures 654 associated with the UI controls 152 to be realized, and therefore the control node data structures 654 are represented in a native structure. This process yields desirable results in resource constrained systems as it reduces the number of native OS resources necessary to render a given UI control 152. Additionally, the process reduces the calls across the VM/native boundary 260 resulting in enhanced efficiency and an increase in computer speed.

In one embodiment, the hierarchical UI control process is applied to a networked system. One such a networked system is illustrated by the computer environment 100 illustrated in FIG. 1. One embodiment of computer software that utilizes extensible Markup Language (XML) to enhance data communications between different application programs is NET, which is commercially available from Microsoft Corporation of Redmond, Wash. The hierarchical UI control process can be configured with a compact framework that provides a small footprint which is desired within the NET framework. Providing a small footprint is a critical aspect to acceptance to as broad a range of devices as possible, especially where the devices are resource constrained. Specifically, in the area of UI performance, much effort has been applied to improve the managed code portion to run indistinguishably from the native code portion.

The hierarchical UI control process decreases the overhead associated with current techniques for creating, managing, and releasing UI controls 152 using a control node data structure 654. Such current techniques require a substantial amount of overhead when marshalling the data necessary to create, maintain synchronization, and destroy the hierarchical UI controls 152.

The hierarchical UI control process provides an alternative process to allocate and manage the data associated with UI controls 152 that have hierarchical data associated with them. The hierarchical UI control process permits a reduction in the necessary number of native OS resources needed in a UI based application's lifetime. The hierarchical UI control process also reduces the number of calls across the VM/native boundary 260 and thus reduces the requisite data type marshalling overhead associated with such calls.

FIG. 9 illustrates an example of a suitable computer environment or network 500 which includes a user interface having hierarchical UI controls 152. Similar resources may use the computer environment and the processes described herein.

The computer environment 100 illustrated in FIG. 9 is a general computer environment, which can be used to implement the techniques described herein. The computer environment 100 is only one example of a computer environment and is not intended to suggest any limitation as to the scope of use or functionality of the computer and network architectures. Neither should the computer environment 100 be interpreted as having any dependency or requirement relating to any one or combination of components illustrated in the exemplary computer environment 100.

The computer environment 100 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of the computer 502 can include, but are not limited to, one or more processors or processing units 504 (optionally including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by the computer 502 and includes both volatile and non-volatile media, and removable and non-removable media.

The system memory 506 includes the computer readable media in the form of non-volatile memory such as read only memory (ROM) 512, and/or volatile memory such as random access memory (RAM) 510. A basic input/output system (BIOS) 514, containing the basic routines that help to transfer information between elements within the computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 9 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer-readable media provide non-volatile storage of computer readable instructions, control node data structures, program modules, and other data for the computer 502. Although the example illustrates a hard disk within the hard disk drive 515, a removable magnetic disk 520, and a non-volatile optical disk 524, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 100.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor, flat panel display, or other type of computer display 200 can also be connected to the system bus 508 via an interface, such as a video adapter 544. In addition to the computer display 200, other output peripheral devices can include components such as speakers (not shown) and a printer 546 which can be connected to the computer 502 via the input/output interfaces 540.

Computer 502 can operate in a networked environment using logical connections to one or more remote computers, such as a remote computer device 548. By way of example, the remote computer device 548 can be a personal computer, portable computer, a server, a router, a network computer, a peer device or other common network node, game console, and the like. The remote computer device 548 is illustrated as a portable computer that can include many or all of the elements and features described herein relative to the computer 502.

Logical connections between the computer 502 and the remote computer device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to the computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with the computer environment 100, program modules depicted relative to the computer 502, or portions thereof, may be stored in a remote memory storage device. By way of example, remote application programs 558 reside on a memory device of the remote computer 548. For purposes of illustration, application programs and other executable program components such as the operating system are illustrated herein as discrete blocks, although it is recognized that such programs and components reside at various times in different storage components of the computer 502, and are executed by the data processor(s) of the computer 502. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects 650, components, control node data structures 654, etc. that perform particular tasks or implement particular abstract data types. Typically, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the systems and processes have been described in language specific to structural features and/or process, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   implementing a user interface (UI) control within a computer environment, wherein the computer environment includes a managed code portion and a native code portion, the implementing the UI control includes:
   creating a plurality of control node data structures within the managed code portion,
   virtualizing a managed UI control within the managed code portion by associating at least two of the control node data structures;
   making a single system call to migrate the managed UI control and the at least two of the control node data structures from the managed code portion into the native code portion to realize the UI control;
   realizing the UI control in the native code portion following migrating the managed UI control into the native code portion;
   re-virtualizing the UT control by:
      generating a modified managed UI control by migrating the UI control into the managed code portion,
      generating a re-virtualized UI control by adding an additional control node data structure to the modified managed UI control, and associating the additional control node data structure in managed code to the modified managed UI control; and
      realizing a modified UI control by migrating the re-virtualized UI control into the native code portion.

2. The method as set forth in claim 1, wherein at least two of the control node data structures are hierarchically associated when they are virtualized to form the managed UI control.

3. The method as set forth in claim 2, wherein the UI control is formed from hierarchically associated control node data structures in a similar association as the managed UI control.

4. The method as set forth in claim 2, wherein the hierarchically associated control node data structures are associated in the form of a menu.

5. The method as set forth in claim 2, wherein the hierarchically associated control node data structures are associated in the form of a tree.

6. The method as set forth in claim 2, wherein the hierarchically associated control node data structures are associated in the form of a command.

7. The method as set forth in claim 1, wherein at least two of the control node data structures that are virtualized to form the managed UI control are associated in the form of a list.

8. The method as set forth in claim 1, wherein at least two of the control node data structures that are virtualized to form the managed UI control are associated in the form of a table.

9. The method as set forth in claim 1, thither comprising adding a child node to one of the control node data structures within the managed code portion.

10. The method as set forth in claim 1, farther comprising populating a control object with the plurality of control node data structures to virtualize the managed UI control.

11. The method as set forth in claim 1, wherein the UI control is generated using a Virtual Machine (VM).

12. The method as set forth in claim 1, wherein the creating a plurality of control node data structures within the managed code portion does not include subsequently synchronizing individual control node data structures between the managed code portion and the native code portion.

13. A method comprising:
   virtualizing a managed user interface (UI) control in a computer environment including a managed code portion and a native code portion, the virtualizing the managed UI control including:
   creating a managed UI control within the managed code portion, the managed UI control including a plurality of control node data structures that are associated with other ones of the control node data structures and a control object to at least partially form the managed UI control, and
   generating a parented UI control by creating a rendering object, and associating the plurality of control node data structures with the rendering object in the managed code portion;
   realizing a native UI control by migrating the parented UI control into a native code portion and at least two of the plurality of control node data structures with a single call, wherein the rendering object is rendered in the native code portion;
   re-virtualizing the native UI control by:
      generating a modified managed UI control by migrating the native UI control into the managed code portion;
      generating a re-virtualized UI control by removing an existing control node data structure from the modified managed UI control; and
      realizing a modified native UI control by migrating the re-virtualized UI control into the native code portion.

14. The method as set forth in claim 13, wherein at least two of the plurality of associated control node data structures are hierarchically associated.

15. The method as set forth in claim 14, wherein the hierarchical association includes a tree.

16. The method as set forth in claim 14, wherein the hierarchical association includes a menu.

17. The method as set forth in claim 14, wherein the hierarchical association includes a command.

18. The method as set forth in claim 13, wherein at least two of the plurality of control node data structures that are associated are linearly associated in the form of a list or a table.

19. The method as set forth in claim 13, wherein the creating a managed UI control within the managed code portion does not include subsequently synchronizing individual control node data structures between the managed code portion and the native code portion.

20. A method comprising:
   virtualizing a managed user interface (UI) control including:
   creating a first managed UI control within the managed code portion, the UI managed control including a plurality of control node data structures that are associated to at least partially form the UI control,
   creating a second managed UI control within the managed code portion by disassociating at least one of the plurality of control node data structures from the associated plurality of control node data structures in the first managed UI control,
   generating a rendering object in the managed code portion wherein the rendering object is associated with the second managed UI control, and
   generating a parented managed UI control by parenting the second managed UI control to the rendering object;
   realizing a native UI control by migrating the parented managed UI control into the native code portion utilizing a single call that conveys at least two of the plurality of control node data structures, wherein the rendering object can render in a native code portion;
re-virtualizing the native UI control by:
generating a modified managed UI control by migrating the native UI control into the managed code portion;
generating a re-virtualized UI control by removing an existing control node data structure from the modified managed UI control; and
realizing a modified native UI control by migrating the re-virtualized UI control into the native code portion.

21. The method as set forth in claim 20, further comprising virtualizing the second managed UI control within the managed code portion.

22. The method as set forth in claim 21, wherein the second managed UI control includes a plurality of control node data structures that are hierarchically associated.

23. The method as set forth in claim 22, wherein the hierarchical association includes a menu.

24. The method as set forth in claim 22, wherein the hierarchical association includes a tree.

25. The method as set forth in claim 20, wherein the second managed UI control includes a plurality of control node data structures that are tabularly associated.

26. The method as set forth in claim 20, wherein the second managed UI control includes a plurality of control node data structures that are linearly associated.

27. The method as set forth in claim 20, wherein the creating does not include subsequently synchronizing individual control node data structures between the managed code portion and the native code portion.

28. A method, comprising:
implementing a user interface (UI) control in managed code in a virtual machine, virtualizing the UI control by including a plurality of associated control node data structures, in which managed code running in a managed code portion can visualized and populate the UI control;
realizing the UI control in which one signal call transitions the UI control and the plurality of associated control node data structures from the managed code portion to a native code portion;
re-virtual zinc the UI control by:
generating a modified managed UI control by migrating the UI control into the managed code portion,
generating a re-virtualized UI control by adding an additional control node data structure to the modified managed UI control, and associating the additional control node data structure in managed code to the modified managed UI control; and
realizing a modified UI control by migrating the re-virtualized UI control into the native code portion.

29. An apparatus comprising:
a processor;
a computer environment including a managed code portion and a native code portion, the managed code portion virtualizing a managed user interface (UI) control, the managed code portion including:
a creating portion for creating a managed UI control within the managed code portion, the managed UI control including a plurality of control node data structures that are associated with other ones of the control node data structures, and
a generating portion for generating a parented UI control by creating a rendering object, the rendering object being associated with a plurality of control node data structures within the managed code portion;
a realizing portion for realizing a native UI control by migrating the parented UI control into a native code portion to convey multiple control node data structures with a single call between the managed code portion and the native code portion, wherein the rendering object is rendered in the native code portion;
a re-virtualizing portion for re-virtualizing the UI control, the re-virtualizing portion including:
a modification portion for generating a modified managed UI control by migrating the UI control into the managed code portion, and
a re-virtualizing portion for generating a re-virtualized UI control by adding an additional control node data structure to the modified managed UI control, the re-virtualizing portion associating the additional control node data structure in managed code to the modified managed UI control; and
a modified native portion for realizing a modified UI control by migrating the re-virtualized UI control into the native code portion.

30. An apparatus comprising:
a processor;
a user interface (UI) control implemented by a computer environment, wherein the computer environment includes a managed code portion and a native code portion, and wherein the computer environment further includes:
means for creating a plurality of control node data structures that are associated with a control object within the managed code portion,
means for virtualizing a managed UI control within the managed code portion by associating at least two of the control node data structures and the control object,
means for parenting a virtualized managed UI control by associating at least two of the control node data structures and the control object with a high level control object;
means for realizing the parented managed UI control in the native code portion by migrating the parented managed UI control into the native code portion utilizing a single call between the managed code portion and the native code portion that conveys at least two of the control node data structures; and
means for re-virtualizing the native UI control by:
generating a modified managed UI control by migrating the native UI control into the managed code portion;
generating a re-virtualized UI control by removing an existing control node data structure from the modified managed UI control; and
realizing a modified native UI control by migrating the re-virtualized UI control into the native code portion.

31. A computer readable storage medium having computer executable instructions for performing steps comprising:
implementing a user interface (UI) control in a managed code portion, virtualizing the UI control by including a plurality of associated control node data structures, in which managed code running in the managed code portion can visualize and populate the UI control;
realizing the UI control in which one signal call transitions the UI control and the plurality of associated control node data structures from the managed code portion to a native code portion; and re-virtualizing the UI control by:
  generating a modified managed UI control by migrating the UI control into the managed code portion,
  generating a re-virtualized UI control by adding an additional control node data structure to the modified managed UI control, and associating the additional control node data structure in managed code to the modified managed UI control; and
  realizing a modified UI control by migrating the re-virtualized UI control into the native code portion.

32. A computer readable storage medium having computer executable instructions for performing steps comprising:
  implementing a user interface (UI) control within a computer environment, wherein the computer environment includes a managed code portion and a native code portion, and wherein the implementing the UI control includes:
    creating a plurality of control node data structures within the managed code portion,
    virtualizing a control object with the plurality of the control node data structures by associating the control object with at least one of the control node data structures and associating a control node data structure with other ones of the control node data structures, and
    parenting the control object with a high level control object, wherein the UI control is parented in the native code portion by migrating the managed UI control into the native code portion with a single call between the managed code portion and the native code portion with a single call that conveys at least two of the control node data structures, wherein the parenting includes realizing a modified UI control;
  re-virtualizing the UI control by:
    generating a modified managed UI control by migrating the UI control into the managed code portion,
    generating a re-virtualized UI control by adding an additional control node data structure to the modified managed UI control, and associating the additional control node data structure in managed code to the modified managed UI control; and
    realizing a modified UI control by migrating the re-virtualized UI control into the native code portion.

33. The computer readable storage medium as set forth in claim 32, wherein at least two of the control node data structures are hierarchically associated when they form the managed UI control.

34. The computer readable storage medium as set forth in claim 33, wherein the UI control is formed from hierarchically associated control node data structures in a similar association as the managed UI control.

35. The computer readable storage medium as set forth in claim 33, wherein the hierarchically associated control node data structures are associated in the form of a menu.

36. The computer readable storage medium as set forth in claim 33, wherein the hierarchically associated control node data structures are associated in the form of a tree.

37. The computer readable storage medium as set forth in claim 33, wherein the hierarchically associated control node data structures are associated in the form of a command.

38. The computer readable storage medium as set forth in claim 32, wherein at least two of the control node data structures form the managed UI control are associated in the form of a list.

39. The computer readable storage medium as set forth in claim 32, wherein at least two of the control node data structures form the managed UI control are associated in the form of a table.

40. The computer readable storage medium as set forth in claim 32, further comprising adding a child node to one of the control node data structures within the managed code portion.

41. The computer readable storage medium as set forth in claim 32, that further populates a control object with the plurality of control node data structures to virtualize the managed UI control.

42. The computer readable storage medium as set forth in claim 32, wherein the UI control is generated using a Virtual Machine (VM).

* * * * *